(12) United States Patent
Asami

(10) Patent No.: US 8,319,777 B2
(45) Date of Patent: Nov. 27, 2012

(54) CHARACTER DISPLAY, CHARACTER DISPLAYING METHOD, INFORMATION RECORDING MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 499 days.

(21) Appl. No.: 12/601,760

(22) PCT Filed: May 16, 2008

(86) PCT No.: PCT/JP2008/059086
§ 371 (c)(1),
(2), (4) Date: Nov. 24, 2009

(87) PCT Pub. No.: WO2008/146630
PCT Pub. Date: Dec. 4, 2008

(65) Prior Publication Data
US 2010/0164960 A1    Jul. 1, 2010

(30) Foreign Application Priority Data
Jun. 1, 2007    (JP) .................................. 2007-146500

(51) Int. Cl.
*G06T 13/40* (2011.01)

(52) U.S. Cl. ........ 345/473; 345/474; 345/475; 715/202; 715/706

(58) Field of Classification Search .......... 345/473–475; 715/202, 706
See application file for complete search history.

(56) References Cited

U.S. PATENT DOCUMENTS 5,736,982 A * 4/1998 Suzuki et al. .................. 715/706
6,144,385 A * 11/2000 Girard ............................ 345/424
6,353,170 B1* 3/2002 Eyzaguirre et al. ............. 84/603

(Continued)

FOREIGN PATENT DOCUMENTS

JP    2001-079262    3/2001

(Continued)

OTHER PUBLICATIONS

Ota, Sayuri et al., "Dance Generation of Several Characters Through Music", FIT2005 Dai 4 Kai Forum on Information Technology, Information Technology Letters, Aug. 22, 2005, vol. 4, pp. 201-204.

(Continued)

*Primary Examiner* — Xiao M. Wu
*Assistant Examiner* — Todd Buttram
(74) *Attorney, Agent, or Firm* — Howard & Howard Attorneys PLLC

(57) ABSTRACT

A character display for attracting user interest by increasing the variety of on-screen display while reducing data processing by making the time variation of posture common among a plurality of characters. The character display (301) comprises: an arrangement selector (303) that, on the basis of instructional input from the user, selects arrangement information stored in an arrangement storage unit (302) that determines the reference positions/orientations of each character; a posture acquirer (305) that acquires, from a posture storage unit (304), a coordinate group representing the posture of the characters in association with the elapsed time from a predetermined time to the present; a mover/rotator (306) that moves/rotates the coordinate group to match the reference position/orientation of each character; and a generating/displaying unit (307) that generates/displays an image wherein the plurality of characters are arranged in the virtual space and taking postures on the basis of the moved/rotated coordinate group.

19 Claims, 11 Drawing Sheets

U.S. PATENT DOCUMENTS

| | | | |
|---|---|---|---|
| 6,559,845 B1 * | 5/2003 | Harvill et al. | 345/473 |
| 6,717,042 B2 * | 4/2004 | Loo et al. | 84/464 R |
| 6,738,067 B2 * | 5/2004 | Hayama et al. | 345/474 |
| 6,898,759 B1 * | 5/2005 | Terada et al. | 715/202 |
| 7,165,223 B2 * | 1/2007 | Kutaragi et al. | 715/745 |
| 2003/0038428 A1 | 2/2003 | Yotoriyama | |
| 2003/0156113 A1 * | 8/2003 | Freedman et al. | 345/473 |
| 2006/0139355 A1 * | 6/2006 | Tak et al. | 345/473 |
| 2007/0002057 A1 * | 1/2007 | Danzig et al. | 345/473 |
| 2007/0040836 A1 * | 2/2007 | Schickler | 345/473 |
| 2008/0049025 A1 * | 2/2008 | Le Tuan | 345/473 |
| 2008/0094400 A1 * | 4/2008 | Yang et al. | 345/473 |
| 2008/0158232 A1 * | 7/2008 | Shuster | 345/474 |

FOREIGN PATENT DOCUMENTS

| | | |
|---|---|---|
| JP | 2001-118084 | 4/2001 |
| JP | 2001-198352 | 7/2001 |
| JP | 2002-092644 | 3/2002 |
| JP | 2003-109025 | 4/2003 |

OTHER PUBLICATIONS

Notification of Reasons for Refusal, Japanese Office Action for Patent Application No. 2007-146500 mailed Feb. 23, 2010 and English Translation, 6 pages.

Taiwanese Office Action with English Translation (Issued Nov. 25, 2011).

\* cited by examiner

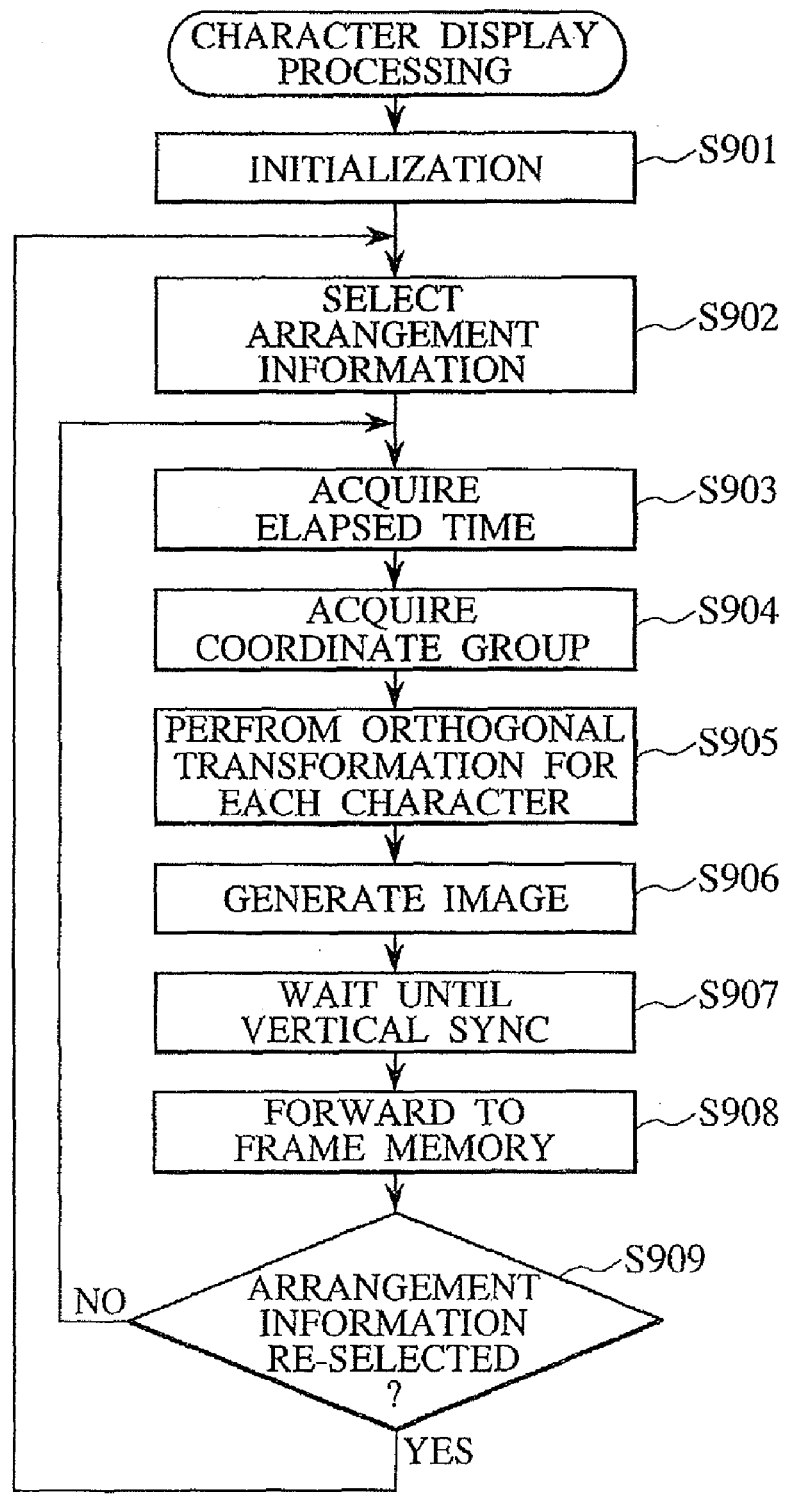

CHARACTER DISPLAY, CHARACTER DISPLAYING METHOD, INFORMATION RECORDING MEDIUM, AND PROGRAM

TECHNICAL FIELD

The present invention relates to a character display and a character displaying method, as well as a computer-readable information recording medium having recorded thereon a program for realizing the above on a computer, as well as the program itself, the above being optimal for attracting user interest by increasing the variety of on-screen display while reducing data processing by making the time variation of posture common among a plurality of characters.

BACKGROUND ART

In the past, a game apparatus has been proposed wherein characters arranged in a virtual space are displayed on-screen such that their positions and postures are varied. Such character display technology is disclosed in the following literature, for example. Patent Literature 1: Unexamined Japanese Application KOKAI Publication No. 2002-092644

In [Patent Literature 1], technology for quickly generating an image of a character is disclosed, having an envelope model wherein polygons corresponding to skin are arranged surrounding a skeleton corresponding to bones.

If the overall position or orientation of the skeleton in a virtual space is varied, then the character moves. If the relative positions or orientations of skeleton components are varied, then the posture of the character is varied. In addition, if the coordinates of the skeleton are mirror-transformed, then the posture of a given character can be made symmetrical to the posture of another character.

If the position and posture of the character skeleton is then varied on the basis of predetermined coordinate data as time elapses from a fixed time (typically, the start time for playback of a song), then video showing the character dancing to the song can be displayed.

In addition, if position and posture relationships among a plurality of character skeletons are made to mutually overlap by translation, then video showing the characters dancing in unison as a group can be displayed.

In addition, the mirror transformation of skeleton coordinates can even be used in the case where a left-side character and a right-side character in the dancing group are dancing with symmetrical motions.

When expressing a dancing group of characters like that described above, operations such as parallel transformations and mirror transformations of coordinates are implemented.

DISCLOSURE OF INVENTION

Problem to be Solved by the Invention

However, if a plurality of characters are simply making identical motions (or alternatively, mirrored motions), then the degree to which user interest is attracted will likely be low. In contrast, if choreography different for each character is prepared, then there is a problem in that not only does the data size become very large, but the processing load for data calculations also increases.

Consequently, there is strong demand for technology whereby the data processing for posture variation is made common for a plurality of characters, while also enabling a diverse on-screen display that attracts user interest as much as possible.

The present invention, solving problems like those described above, has as an object to provide a character display and a character displaying method, as well as a computer-readable information recording medium having recorded thereon a program for realizing the above on a computer, as well as the program itself, the above being optimal for attracting user interest by increasing the variety of on-screen display while reducing data processing by making the time variation of posture common among a plurality of characters.

Means to Solve the Problem

In order to achieve the above object, the following inventions are disclosed in accordance with the principle of the present invention.

A character display in accordance with a first aspect of the present invention is provided with an arrangement storage unit, an arrangement selector, a posture storage unit, a posture acquirer, a mover/rotator, and a generating/displaying unit, and is configured as follows.

More specifically, the arrangement storage unit plurally stores arrangement information defining the reference positions and reference orientations in a virtual space for each of a plurality of characters.

The arrangement information determines at what place and in what direction each character faces in the virtual space.

For example, in arrangement information expressing conditions like those of a line dance, the reference orientations of the characters are parallel to each other, and the reference positions of the characters are at equal intervals.

In arrangement information expressing conditions like those of Bon Odori, the reference positions of the characters are arranged circularly and at equal intervals, and the reference orientations of the characters are made to rotate in the same direction following the circumference of the circle.

In arrangement information expressing conditions like those of a pop idol group wherein a single person sings a song while the other members watch the singer, the reference position of a given character is set in the center of a circle, the reference positions of the other characters are set on the circumference of the circle at equal intervals, and the reference orientations of the other characters are set to face the center character.

Herein, three types of arrangement information are shown, but a variety of such arrangement information may be prepared, and character arrangements assumed to be appealing may be plurally prepared in advance.

Meanwhile, the arrangement selector selects one set of arrangement information from among the plurality of stored arrangement information.

The opportunities whereby the arrangement selector selects arrangement information are presumed to be, for example, the times when a break occurs in a predetermined bar of a song being simultaneously played, or the times when the user presses a predetermined key or button, as described later. In addition, the question of which arrangement information is selected may be determined randomly, the arrangement information may be selected in order following a predetermined sequence, or according to instructional input from the user.

In addition, the posture storage unit stores coordinate groups expressing character positions and postures relative to the reference positions and reference orientations, and in association with elapsed times.

The coordinate groups express to what degree over time a skeleton (also referred to as hereinafter as "bones") for expressing character position and posture is displaced in a local coordinate system expressing the reference position and reference orientation of a character.

Each skeleton is assigned control points constituting a skin corresponding to the character's skin, which are used as polygon vertices or the control points of NURBS (Non-Uniform Rational B-Spline) curves to determine skin shapes. By pasting predetermined textures on these shapes, the overall image of a character is formed.

In addition, the posture acquirer acquires, from among the stored coordinate groups, a coordinate group stored in association with the elapsed time from a predetermined time to the present.

Stored in the posture storage unit are time series of character postures. For example, in the case where a character is made to dance to a song, the time when the song is started is taken to be the "predetermined time", and character postures are stored in advance and corresponding to the time elapsed when the song is played. The character posture corresponding to the current time is then acquired by the posture acquirer.

In addition, for each character in the plurality of characters defined by the selected arrangement information, the mover/rotator performs orthogonal transformations with respect to a coordinate group obtained from the reference positions and reference orientations defined for the characters in the arrangement information. The obtained coordinate group is then taken to be the coordinate group expressing the positions and orientations of the characters in the virtual space.

In the arrangement information, reference positions and reference orientations are defined for each character. Consequently, this information is thought of as a type of local coordinate system, the coordinate group expressing the postures of a character is treated as a collection coordinate values in the local coordinate system, and then coordinate values in a global coordinate system fixed in the virtual space are calculated.

Herein, an orthogonal transformation means a translation, rotation, reflection (i.e., mirror transformation), or similar coordinate transformation wherein the distances between points is not changed by the transformation.

The generating/displaying unit then uses the calculated coordinate group expressing the respective positions and postures of the plurality of characters to generate an image wherein the characters are arranged in the virtual space, and then displays the generated image.

As described above, if a coordinate group expressing the positions and postures of respective characters is obtained, then an image expressing the state of each character can be generated on the basis thereof. In this way, an image expressing the state of the virtual space is generated and then displayed on-screen.

The processing conducted by the posture acquirer, the mover/rotator, and the generating/displaying unit is repeated according to an appropriate period, such as the vertical sync interrupt period. In so doing, video is displayed showing how a plurality of characters change postures as time elapses.

In this way, according to the present invention, the data size of motion information is reduced, since each character assumes the same postures, and the posture of each character can be obtained by means of orthogonal transformations, which can be calculated with hardware assistance. For these reasons, not only is the calculation load low, but in addition, positions and orientations can be changed using a variety of arrangement information, and since the arrangement information can be switched at suitable timings, it is possible to attract user interest.

In addition, in the character display of the present invention, the generating/displaying unit may also be configured such that a still image or video prepared in advance is displayed instead of displaying generated images, wherein the display starts upon selection of the arrangement information and lasts until a predetermined transition time has elapsed.

In the above invention, an image with a newly-updated character arrangement is displayed on-screen immediately after the arrangement information is selected. However, in this case, since the positions and orientations of each character are updated instantaneously, it will appear as though each character moves instantaneously in the virtual space, and thus may feel unnatural, depending on the application.

In the present invention, when switching arrangement information, a still image (such as an image painted completely black, for example) or a video (such as a video depicting lightning crashing or an explosion, for example) that has been prepared in advance in displayed for an instant (i.e., a extremely short amount of time).

Consequently, in the present invention, a transitional still image or video is displayed for just a short amount of time when switching character arrangements, thereby enabling user discomfort with respect to changes in character positions and orientations to be reduced as much as possible.

In addition, in the character display of the present invention, each set of arrangement information in the stored plurality of arrangement information may also be associated with background information defining objects and light sources arranged in the virtual space. The generating/displaying unit may then be configured to generate an image wherein the objects defined in the background information associated with the selected arrangement information are arranged in the virtual space behind the plurality of characters, and wherein the objects and the characters are illuminated by the light sources defined in the background information.

For each set of arrangement information, the positions of light sources and object groups forming the background of the characters are determined. Consequently, when the arrangement information is switched, the background and the lighting is also switched.

In this way, if not only the positions and orientations of the characters are varied, but instead everything is varied, including the background and lighting, then varying the positions and orientations of characters is not noticeable, even when varied instantaneously.

Consequently, according to the present invention, user discomfort with respect to changes in the positions and orientations of characters can be reduced as much as possible.

In addition, the character display of the present invention may also be configured such that mutually non-overlapping time segments may be additionally associated with each set of arrangement information in the plurality of stored arrangement information. The arrangement selector may then select, from among the stored plurality of arrangement information, arrangement information containing elapsed time from a predetermined time to the present for an associated time segment.

In other words, if the elapsed time from the predetermined time reaches the start time of a time segment for a particular set of arrangement information, then that arrangement information is selected. Thus, when making a group of characters dance in time with a song as described above, one of the sets of arrangement information is assigned to each time segment of the bars in the song.

In so doing, the arrangement information is switched at the breaks between bars of the song. For this reason, not only do the characters dance in a group, but in addition, the positions and orientations of the characters are also varied in time with the song.

In the above preferred embodiment of the present invention, arrangement information is selected on the basis of predetermined time segments. For this reason, the positions and orientations of characters can be automatically varied at timings with favorable breaks, thus attracting the interest of the user.

In addition, the character display of the present invention may also be configured such that perspective points and perspective directions in the virtual space are additionally associated with each set of arrangement information in the plurality of stored arrangement information. The generating/displaying unit may then project an image using the perspective point and perspective direction associated with the selected arrangement information, thereby generating an image wherein the plurality of characters are arranged in the virtual space.

Herein, a perspective point and a perspective direction mean a camera position and direction for displaying three-dimensional graphics in a virtual space that define a projection plane normal to the perspective direction and a certain distance away from the camera (it is possible to suitably configure this distance). An image is then generated using various projection methods, such as perspective projection, wherein the end of the projection is taken to be the position where the line segment connecting an object and the camera intersects the projection plane, or parallel projection, wherein the end of the projection is taken to be the position where a line segment extending from the object and parallel to the perspective direction intersects the projection plane.

According to the present invention, since the perspective position and perspective direction are switched when the arrangement information is switched, discomfort felt by the user can be reduced, even if the positions and orientations of the characters change instantaneously.

In addition, in the character display of the present invention, the arrangement selector may also be configured to select arrangement information from among the plurality of stored arrangement information according to instructional input from the user.

For example, the arrangement information may be associated a cyclical order, such that if the user presses a first button on a controller being used, then the "Next" set of arrangement information following the current arrangement information is selected. If a second button is pressed, then the "Previous" set of arrangement information preceding the current arrangement information is selected.

According to the present invention, the positions, orientations, and arrangement of characters are varied on the basis of the user's will, thereby enabling the user to view video showing the postures of characters being varied in an arrangement matching the user's preferences.

In addition, the character display of the present invention may also be configured such that perspective positions and perspective directions in the virtual space are additionally associated with each set of arrangement information in the stored plurality of arrangement information. The instructional input from the user may be instructional input specifying one of the perspective positions and one of the perspective directions associated with each set of arrangement information in the stored plurality of arrangement information. The arrangement selector may then select the arrangement information associated with the perspective position and the perspective direction specified by the instructional input from the user. The generating/displaying unit may then project an image using the perspective position and the perspective direction associated with the selected arrangement information, thereby generating an image wherein the plurality of characters are arranged in the virtual space.

To explain in conjunction with the above example: camera positions and orientations are plurally prepared, and a cyclical order is associated thereto. When the user presses a first button on a controller being used, the "Next" camera following the current camera is selected. If a second button is pressed, then the "Previous" camera preceding the current camera is selected, for example.

In addition, arrangement information is associated with each camera, such that when the camera is switched, the arrangement information is also switched.

According to the present invention, the camera position and orientation, as well as the positions, orientations, and arrangement of characters are varied on the basis of the user's will, thereby enabling the user to view video showing the postures of characters being varied in a manner matching the user's preferences.

In addition, the character display of the present invention may be further provided with an emphasis identifier and an arrangement exchanger, and configured as follows.

More specifically, a main character for a set of arrangement information may be additionally associated with each set of arrangement information in the stored plurality of arrangement information.

For example, in a dancing group, it is typical for the character featured most prominently to be arranged in the center. Consequently, such a character that is featured most prominently may be taken to be the main character, and information may be defined indicating which is the main character among the characters whose positions and orientations are defined in the arrangement information.

Meanwhile, the emphasis identifier identifies, from among the plurality of characters, the emphasized character projected closest to a predetermined emphasized position in the generated image.

It is typical for the screen center to be adopted as the predetermined emphasized position. In this case, the emphasized character becomes the character with the shortest distance to the line segment extending from the perspective position and in the perspective direction.

Furthermore, when a single set of arrangement information is selected from among the stored plurality of arrangement information by instructional input from the user, the arrangement exchanger exchanges the reference position and reference orientation of the emphasized character identified immediately prior to the selection with the reference position and reference orientation of the main character in the selected arrangement information.

Since the emphasized character is the character that the user is assumed to be focusing on, it may be desirable, depending on the application, to arrange the emphasized character in a position where that character will be emphasized even when the character arrangement is varied.

Consequently, in order to arrange the immediately previous emphasized character at the position and orientation of the main character in the new arrangement information, the positions and orientations of the emphasized character and the main character are exchanged.

According to the present invention, the character that the user is assumed to be focusing on is arranged at a position where it is assumed that the character will continue to be emphasized, even if the arrangement information is switched. For this reason, discomfort felt by the user can be reduced.

In addition, in the character display of the present invention, the arrangement exchanger may also be configured such that, in the exchanged arrangement information, the reference positions and reference orientations of characters other than the emphasized character are also randomly exchanged with each other.

In the above preferred embodiment of the present invention, the positions of characters that the user is not assumed to be focusing on are randomly exchanged with each other. In so doing, the variety of the on-screen display is increased, and the interest of the user can be attracted.

A character displaying method in accordance with another aspect of the present invention references the following: an arrangement storage unit storing a plurality of arrangement information defining reference positions and reference orientations in a virtual space for each of a plurality of characters; and a posture storage unit storing coordinate groups expressing character positions and postures relative to the reference positions and reference orientations, and in association with elapsed time. Typically, the character displaying method is executed by a character display having an arrangement storage unit, a posture storage unit, as well as an arrangement selector, a posture acquirer, a mover/rotator, and a generating/displaying unit. The character displaying method includes an arrangement selecting step, a posture acquiring step, a moving/rotating step, and a generating/displaying step, and is configured as follows.

More specifically, in the arrangement selecting step, typically an arrangement selector selects one set of arrangement information from among the stored plurality of arrangement information.

Meanwhile, in the posture acquiring step, typically a posture acquirer acquires, from the stored coordinate groups, a coordinate group stored in association with the time elapsed from a predetermined time to the present.

In addition, in the moving/rotating step, typically a mover/rotator performs orthogonal transformations for each character in the plurality of characters defined by the selected arrangement information and with respect to a coordinate group obtained from the reference positions and reference orientations defined for the characters in the arrangement information. The obtained coordinate group is then taken to be the coordinate group expressing the positions and orientations of the characters in the virtual space.

In addition, in the generating/displaying step, typically a generating/displaying unit uses the calculated coordinate group expressing the respective positions and postures of the plurality of characters to generate an image wherein the characters are arranged in the virtual space, and then displays the generated image.

A program in accordance with another aspect of the present invention is configured to cause a computer to function as the respective components of the above character display.

In addition, the program of the present invention can also be recorded onto a computer-readable information storage medium, such as a compact disc, a flexible disk, a hard disk, a magneto-optical disc, a digital video disc, magnetic tape, or semiconductor memory.

The above program may be distributed or sold via a computer communication network independently of the computer that executes the program. In addition, the above information storage medium may also be distributed or sold independently of the computer.

ADVANTAGES OF THE INVENTION

According to the present invention, a character display and a character displaying method, as well as a computer-readable information recording medium having recorded thereon a program for realizing the above on a computer, as well as the program itself, are provided, the above being optimal for attracting user interest by increasing the variety of on-screen display while reducing data processing by making the time variation of posture common among a plurality of characters.

BRIEF DESCRIPTION OF DRAWINGS

FIG. 13 A flowchart illustrating the control flow for character display processing executed by a character display in accordance with the present embodiment.

EXPLANATION OF SYMBOLS

Figure 1:
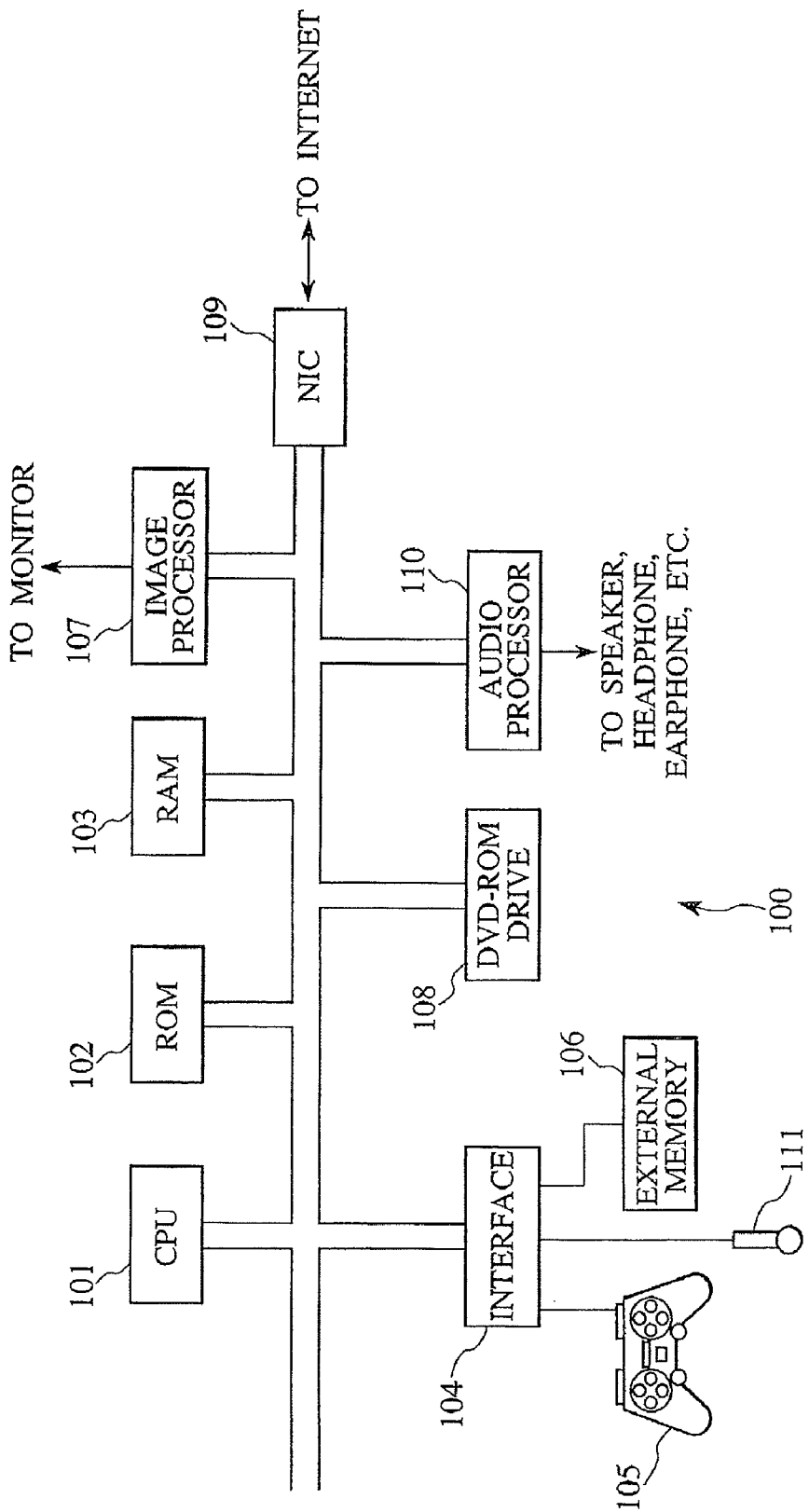
FIG. 1 A schematic diagram illustrating the general configuration of a typical information processing apparatus fulfilling the functions of the character display of the present invention.

100 information processing apparatus
101 CPU
103 RAM
104 interface
105 controller
106 external memory
107 image processor
108 DVD-ROM drive
109 NIC
110 audio processor
111 microphone 201 up button
202 down button
203 left button
204 right button
205 circle button
206 cross button
207 triangle button
208 square button
209 SELECT button
210 START button
211 ANALOG button
212 indicator
213 joystick
214 joystick
215 L1 button
216 L2 button
217 R1 button
218 R2 button
301 character display
302 arrangement storage unit
303 arrangement selector
304 posture storage unit
305 posture acquirer
306 mover/rotator
307 generating/displaying unit
308 emphasis identifier
309 arrangement exchanger
401 hat-wearing character
402 white-clothed, white-haired character
403 white-clothed, black-haired character
404 black-clothed, white-haired character
405 black-clothed, black-haired character
411 floor
501 local coordinate system for hat-wearing character
502 local coordinate system for white-clothed, white-haired character
503 local coordinate system for white-clothed, black-haired character
504 local coordinate system for black-clothed, white-haired character
505 local coordinate system for black-clothed, black-haired character
511 global coordinate system
531 perspective position
532 perspective direction
552 square
571 bone
951 convergent point

BEST MODES FOR CARRYING OUT THE INVENTION

Embodiments of the present invention will be hereinafter described. Hereinafter, in order to ease understanding, an embodiment that realizes the present invention by using an information processing apparatus for video games will be described. However, the embodiment hereinafter described is for the sake of explanation, and does not limit the scope of the present invention. Consequently, although it is possible for persons skilled in the art to adopt embodiments wherein all or part of the respective elements herein have been substituted with equivalents thereof, such embodiments are also to be included in the scope of the present invention.

FIG. 1 is a schematic diagram illustrating the general configuration of a typical information processing apparatus that fulfills the functions of the character display of the present invention by executing a program. Hereinafter, a description will be given with reference to FIG. 1.

The information processing apparatus 100 is provided with a CPU (Central Processing Unit) 101, ROM 102, RAM (Random Access Memory) 103, an interface 104, a controller 105, external memory 106, an image processor 107, a DVD-ROM (Digital Versatile Disc ROM) drive 108, a NIC (Network Interface Card) 109, an audio processor 110, and a microphone 111.

A DVD-ROM storing a program and data for a game is loaded into the DVD-ROM drive 108, and power is supplied to the information processing apparatus 100. In so doing, the program is executed, and the character display of the present embodiment is realized.

The CPU 101 controls the overall operation of the information processing apparatus 100, and exchanges control signals and data with respective configuration elements connected thereto. In addition, the CPU 101 uses an ALU (Arithmetic Logic Unit) (not shown in the drawings) with respect to a storage area accessible at high speeds known as a register (not shown in the drawings), and is thereby able to conduct: arithmetic computations such as addition, subtraction multiplication, and division; logical computations such as OR, AND, and NOT operations; and bitwise operations such as bitwise OR operations, bitwise AND operations, bitwise NOT operations, bit shifts, and bit rotations. Furthermore, in order to conduct multimedia-oriented operations such as addition, subtraction, multiplication, division, or other saturation computations, trigonometric functions, and vector computations at high speeds, the CPU 101 itself is configured for such operations or is provided with a coprocessor.

Recorded on the ROM 102 is an IPL (Initial Program Loader) executed immediately upon power-on. By executing the IPL, the program recorded onto the DVD-ROM is loaded into the RAM 103 and execution thereof by the CPU 101 is initiated. In addition, also recorded on the ROM 102 is an operating system program and various data necessary for overall operational control of the information processing apparatus 100.

The RAM 103 is for temporarily storing data or programs, and retains programs or data read from the DVD-ROM, as well as other data necessary for advancing the game or conducting chat communication. In addition, the CPU 101 may conduct processing such as: establishing a variable area in the RAM 103, and then performing computations by causing the ALU to directly operate on a value stored in the variable; and storing a value stored in the RAM 103 in a temporary register, performing computations on the register, and then writing the computational result back to memory.

The controller 105 is connected via the interface 104, and accepts operational input issued by the user to advance the game.

Figure 2:
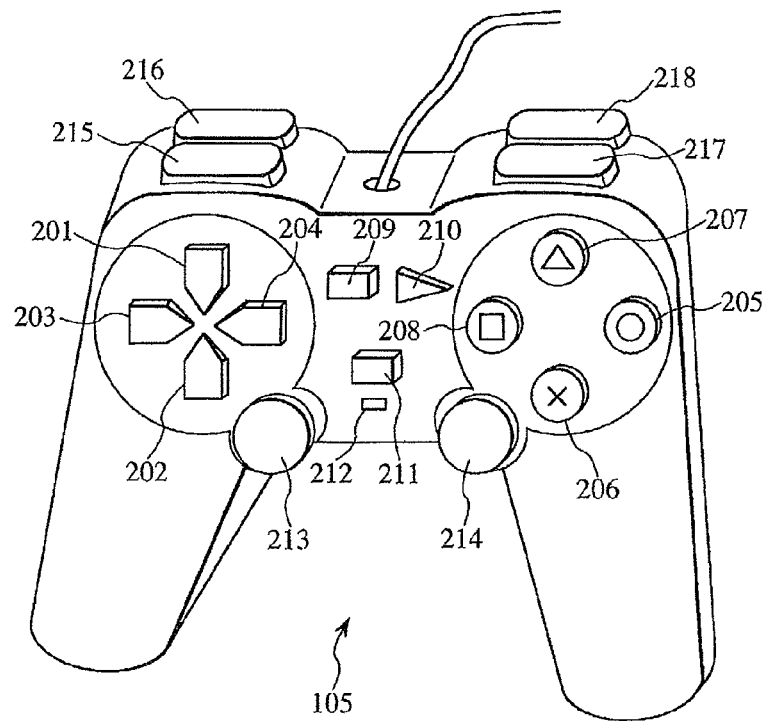
FIG. 2 An explanatory diagram illustrating the exterior of a controller for an information processing apparatus.

FIG. 2 is an explanatory diagram illustrating the exterior of the controller 105. Hereinafter, a description will be given with reference to FIG. 2.

On the left side of the controller 105, there are arranged an up button 201, a down button 202, a left button 203, and a right button 204 used to issue operational input indicating up, down, left, and right.

On the right side, there are arranged a circle button 205 used to issue confirming operational input, a cross button 206 used to issue canceling operational input, a triangle button 207 used to issue instructional input such as for menu display, and a square button 208 used to issue other instructional input.

In the center, in addition to a SELECT button 209 and a START button 210, there is arranged an ANALOG button 211 for issuing instructions to start or stop analog input, as well as an indicator 212 for displaying whether analog input is enabled or disabled.

In addition, in the lower portion of the center, there are arranged joysticks 213 and 214 for issuing instructional input not limited to up, down, left and right, and dependent on the magnitude of the direction.

Furthermore, on the top, there are arranged an L1 button 215, an L2 button 216, an R1 button 217, and an R2 button 218 able to be used for various instructional input.

Each of the buttons 201 to 208 and 215 to 218 of the controller 105 is provided with a pressure sensor. When analog input is enabled, it can be detected which buttons are being pressed, while in addition, the magnitude of the pressure of the user's pressing can be obtained in 256 steps from 0 to 255.

The joysticks 213 and 214 of the controller 105 are provided with strain gauges, thereby enabling the detection of how far and in what direction the joysticks 213 and 214 are being bent.

Returning to FIG. 1, external memory 106 is removably connected via the interface 104, and rewritably stores information such as data indicating game or other play conditions (such as past achievements), data indicating the state of game progress, and log (i.e., records) data of chat communication in the case of network multiplayer. The user issues instructional input via the controller 105, and as a result, the above data can be recorded to the external memory 106 as appropriate.

The DVD-ROM loaded into the DVD-ROM drive 108 has recorded thereon a program for realizing the game, as well as graphics data and audio data associated with the game. By means of control by the CPU 101, the DVD-ROM drive 108 conducts read processing with respect to the DVD-ROM loaded thereinto, and thereby reads necessary programs or data, which are then temporarily recorded in the RAM 103 or elsewhere.

The image processor 107 takes data read from the DVD-ROM and processed by the CPU 101 or a graphics processor (not shown in the drawings) provided in the image processor 107, and subsequently records the processed data to frame memory (not shown in the drawings) provided in the image processor 107. The image information recorded in the frame memory is converted into a video signal at a predetermined sync timings and then output to a monitor (not shown in the drawings) connected to the image processor 107. In so doing, the display of various images becomes possible.

The graphics processor is able to execute computations to overlay two-dimensional images, transparency computations such as alpha blending, and various saturation computations at high speeds.

In addition, the graphics processor is also able to execute computations at high speeds whereby polygon information with various accompanying texture information is arranged in a virtual three-dimensional space and rendered using a z-buffering technique to obtain a rendered image overlooking the polygons arranged in a virtual three-dimensional space from a predetermined perspective position and in predetermined perspective direction.

Furthermore, as a result of the CPU 101 and the graphics processor operating cooperatively, it is possible to follow font information defining the shapes of text characters and draw text strings as two-dimensional images in the frame memory or on respective polygon surfaces.

The NIC 109 is for connecting the information processing apparatus 100 to a computer communication network (not shown in the drawings) such as the Internet. The NIC 109 is configured to include a device following the 10BASE-T/ 100BASE-T standards used when forming a LAN (Local Area Network), an analog modem for connection to a network using a telephone line, an ADSL (Asymmetric Digital Subscriber Line) mode, or a cable mode for connecting to a network using a cable television line, for example, as well as an interface (not shown in the drawings) that mediates between the above device and the CPU 101.

The audio processor 110 converts audio data read from the DVD-ROM into an analog audio signal, and then causes the signal to be output from one or more speakers (not shown in the drawings) connected thereto. In addition, under control of the CPU 101, the audio processor 110 also generates sound effects or music data to be produced during the progression of the game, and then causes audio corresponding to the above to be output from one or more speakers, headphones (not shown in the drawings), or earphones (not shown in the drawings).

In the audio processor 110, if the audio data recorded onto the DVD-ROM is MIDI data, then the audio processor 110 references sound bank data provided therein to convert the MIDI data into PCM data. In addition, in the case of compressed audio data such as data in the ADPCM format or the Ogg Vorbis format, the audio processor 110 expands and converts the compressed data into PCM data. By D/A (Digital/Analog) converting the PCM data at timings according to the sampling frequency and then outputting to one or more speakers, audio output becomes possible.

Furthermore, in the information processing apparatus 100, a microphone 111 can also be connected via the interface 104. In this case, the information processing apparatus 100 is configured such that an analog signal from the microphone 111 is A/D converted at a suitable sampling frequency, and then mixed or otherwise processed as a digital signal in PCM format by the audio processor 110.

In addition to the above, the information processing apparatus 100 may also be configured to use a high-capacity auxiliary storage device such as a hard disk to fulfill functions similar to those of the ROM 102, the RAM 103, the external memory 106, and the DVD-ROM loaded into the DVD-ROM drive 108, for example.

The information processing apparatus 100 thus described is equivalent to what is known as a "consumer video game console". However, the present invention can be realized as long as an apparatus conducts image processing so as to display a virtual space. Consequently, it is also possible to realize the present invention on a variety of computing devices, such as mobile phones, portable video game consoles, karaoke devices, and general business computers.

For example, similarly to the above information processing apparatus 100, a general computer may be provided with a CPU, RAM, ROM, a DVD-ROM drive, and a NIC, and also be provided with an image processor having simpler functions than that of the information processing apparatus 100. In addition to having a hard disk as an auxiliary storage device, the general computer may also be configured to be able to use media such as flexible disks, magneto-optical discs, and magnetic tape. In addition, instead of the controller 105, the general computer may use devices such as a keyboard and mouse as input devices.

(Character Display)

Figure 3:
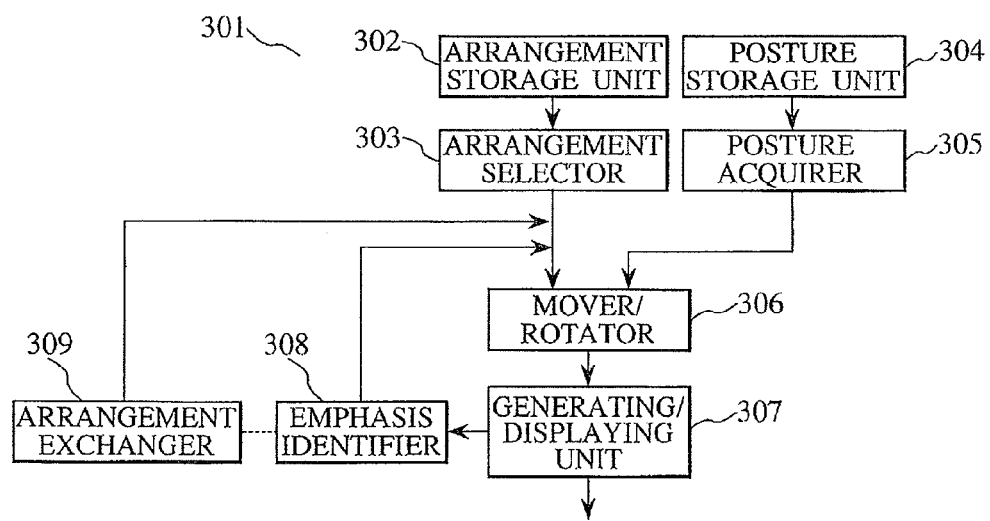
FIG. 3 An explanatory diagram illustrating the general configuration of an embodiment of a character display realized as a result of executing a program on the above information processing apparatus.

FIG. 3 is an explanatory diagram illustrating the general configuration of an embodiment of a character display realized as a result of executing a program on the above information processing apparatus 100. Hereinafter, a description will be given with reference to FIG. 3.

The character display 301 is provided with an arrangement storage unit 302, an arrangement selector 303, a posture storage unit 304, a posture acquirer 305, a mover/rotator 306, and a generating/displaying unit 307.

In addition, the character display 301 may also be configured to further include an emphasis identifier 308 and an arrangement exchanger 309 as optional elements. These will be described in a later embodiment.

First, the arrangement storage unit 302 plurally stores arrangement information defining reference positions and reference orientations in a virtual space for each of a plurality of characters.

The arrangement information determines where and in what orientation each character is arranged in the virtual space.

FIGS. 4, 5, 6, and 7 are explanatory diagrams respectively illustrating images expressing characters arranged in a virtual space on the basis of given arrangement information. FIGS. 8, 9, 10, and 11 are explanatory diagrams respectively summarizing the arrangement information respectively associated with FIGS. 4, 5, 6, and 7. Hereinafter, a description will be given with reference to the above drawings.

In the present examples, five characters are displayed on the floor 411 of the virtual space: a hat-wearing character 401, a white-clothed, white-haired character 402, a white-clothed, black-haired character 403, a black-clothed, white-haired character 404, and a black-clothed, black-haired character 405.

Figure 4:
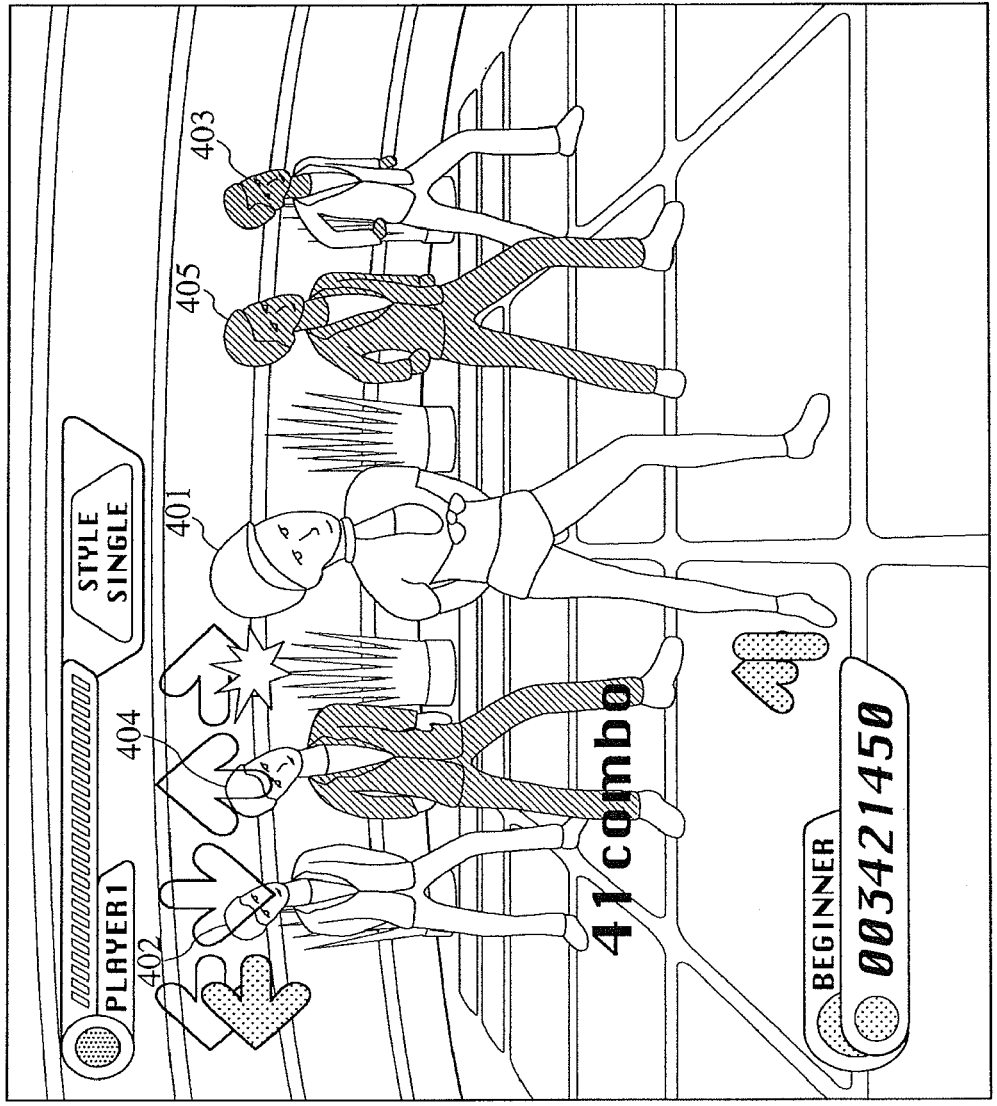
FIG. 4 An explanatory diagram illustrating an image expressing characters arranged in a virtual space on the basis of arrangement information.

In FIG. 4, the five characters are arranged in a V shape, with the hat-wearing character 401 in the front, the black-clothed, black-haired character 405 and the black-clothed, white-haired character 404 on the right and left sides, respectively, and the white-clothed, black-haired character 403 and the white-clothed, white-haired character 402 on the right and left ends, respectively. All the five characters face the direction of the audience, and are standing on a flat floor 411 divided into a square grid.

Figure 8:
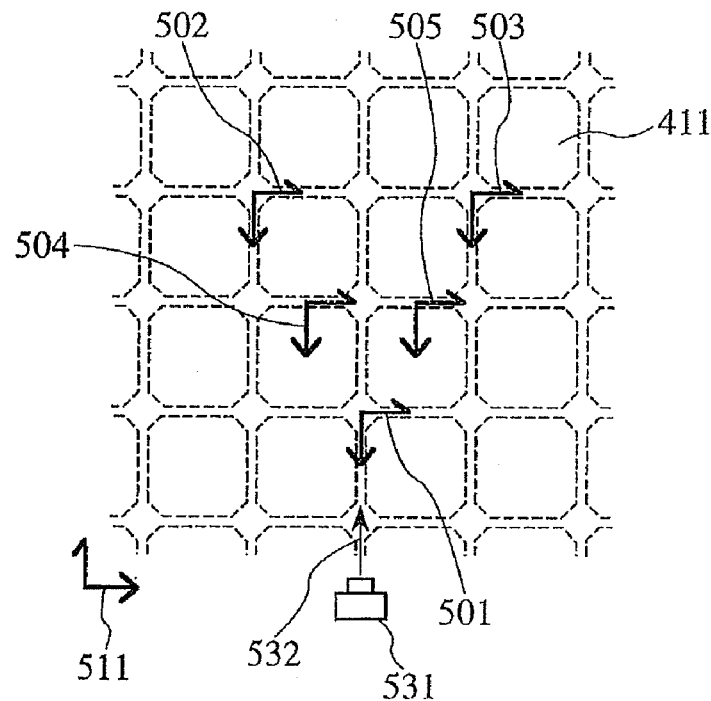
FIG. 8 An explanatory diagram summarizing arrangement information.

FIG. 8 summarizes the arrangement information corresponding to FIG. 4. FIG. 8 illustrates the view as seen from above the heads of the five characters.

A local coordinate system 501, a local coordinate system 502, local coordinate system 503, a local coordinate system 504, and a local coordinate system 505 respectively correspond to the hat-wearing character 401, the white-clothed, white-haired character 402, the white-clothed, black-haired character 403, the black-clothed, white-haired character 404, and the black-clothed, black-haired character 405. The local coordinate systems 501 to 505 are arranged in a global coordinate system 511 corresponding to the floor 411.

The origins of the local coordinate systems 501 to 505 correspond to the positions of the characters 401 to 405. In addition, the orientations of the local coordinate systems 501 to 505 correspond to the orientations of the characters 401 to 405. In other words, each local coordinate system determines the reference position and reference orientation of a corresponding character.

In the examples shown in FIGS. 4 to 11, the local coordinate systems 501 to 505 take the x axis to be the direction extending from the legs to the head, the y axis to be the direction extending from the left hand to the right hand, and the z axis to be the direction extending from the back to the stomach, when the characters 401 to 405 are in the basic posture.

The global coordinate system 511 sets the y axis and the z axis to follow the floor 411, and sets the z axis to be the direction extending from the floor 411 to the ceiling.

In the present example, the view looks in a direction facing the floor 411, and all of the characters 401 to 405 are standing vertically in the same direction with respect to the floor 411.

For this reason, illustration of the x axis is omitted in the local coordinate systems 501 to 505 and the global coordinate system 511 (and similarly hereinafter). In addition, the tip of the y axis arrow is shown having a one-sided shape (like a checkmark with an elongated stem), while the tip of the z axis arrow is shown having a two-sided shape (like a V with a vertical bar down the center).

As shown in FIG. 8, the local coordinate systems 501, 502, 503, 504, and 505 are mutually parallel (i.e., the x-coordinate axes are parallel to each other, the y-coordinate axes are parallel to each other, and the z-coordinate axes are parallel to each other), and the positions of the origins thereof are arranged in a V.

Meanwhile, the global coordinate system 511 is fixed to the floor 411 (i.e., linked to the floor 411), and its positional relationship relative to the local coordinate systems 501, 502, 503, 504, and 505 is not limited to the example shown in FIG. 8, and is arbitrary (similarly hereinafter).

The local coordinate systems 501, 502, 503, 504, and 505 determine the positions and orientations when the characters 401, 402, 403, 404, and 405 are in the basic posture. Consequently, when varying the postures of the characters 401, 402, 403, 404, and 405, the respective control points may be moved by the same displacements in the local coordinate systems 501, 502, 503, 504, and 505.

In addition, FIG. 8 respectively shows the perspective position 531 for displaying the virtual space as three-dimensional graphics as a graphic shaped like a camera, while also showing the perspective direction 532 as a slender arrow (similarly hereinafter). By conducting a perspective projection focused at the perspective position 531 on a projection plane normal to the perspective direction 532 and a predetermined distance away from the perspective position 531 in the perspective direction 532, an image like that shown in FIG. 4 is generated.

Figure 5:
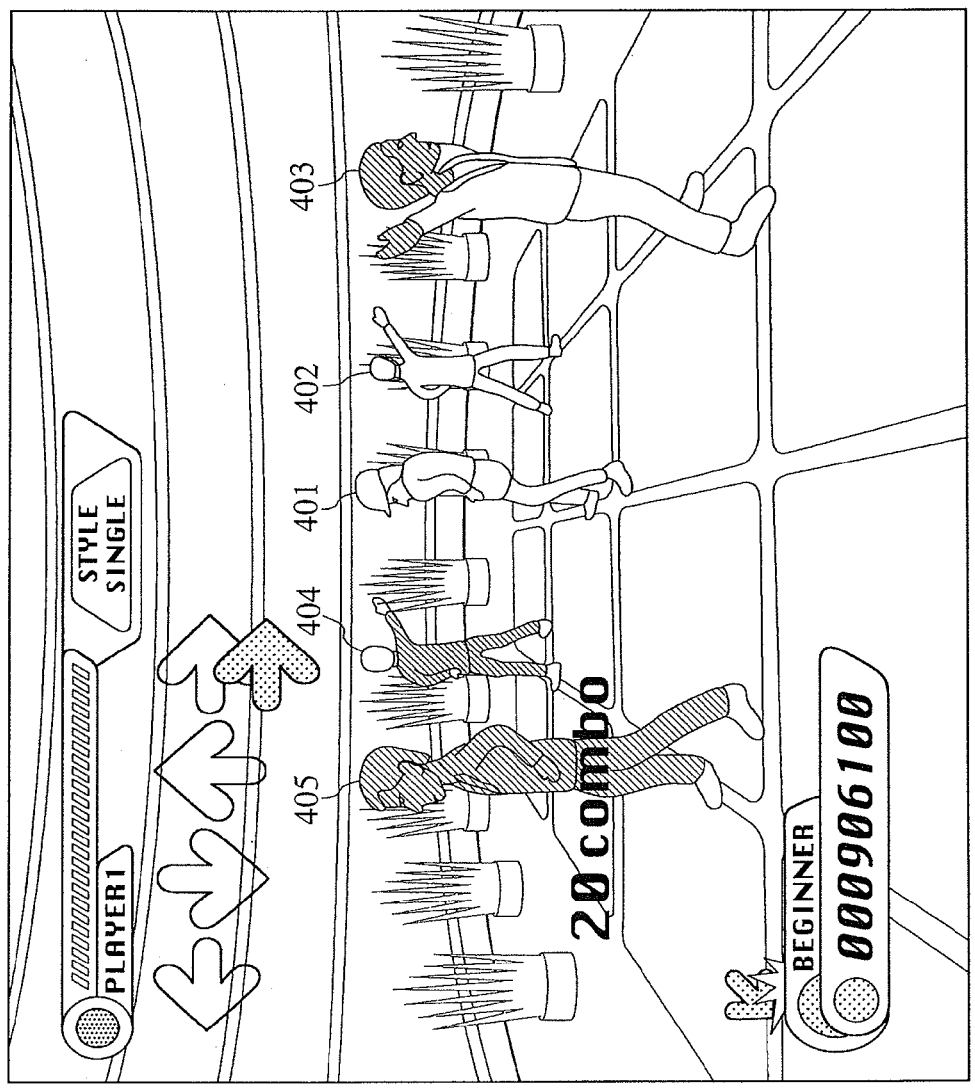
FIG. 5 An explanatory diagram illustrating an image expressing characters arranged in a virtual space on the basis of arrangement information.
Figure 6:
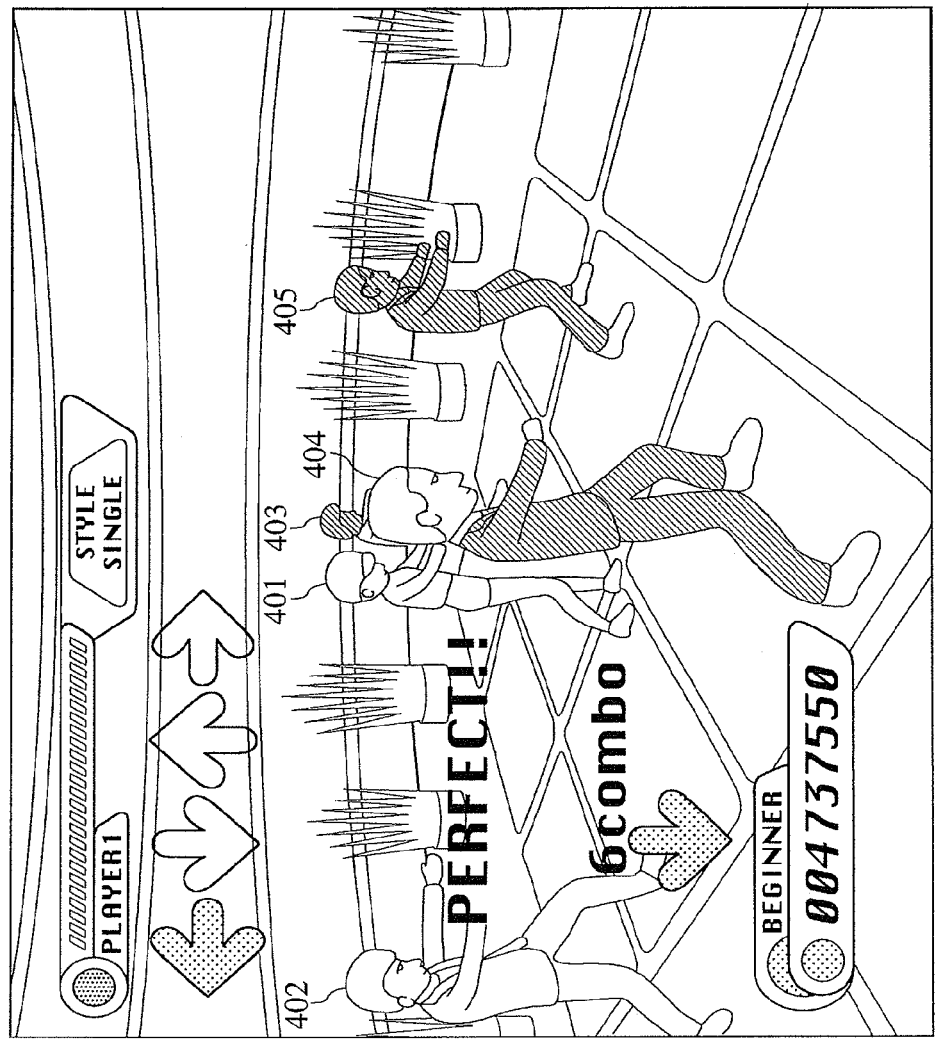
FIG. 6 An explanatory diagram illustrating an image expressing characters arranged in a virtual space on the basis of arrangement information.

FIGS. 5 and 6 display four characters arranged at the vertices of a square: the white-clothed, white-haired character 402, the white-clothed, black-haired character 403, the black-clothed, white-haired character 404, and the black-clothed, black-haired character 405. The hat-wearing character 401 is displayed as being arranged in the center of the square.

Figure 9:
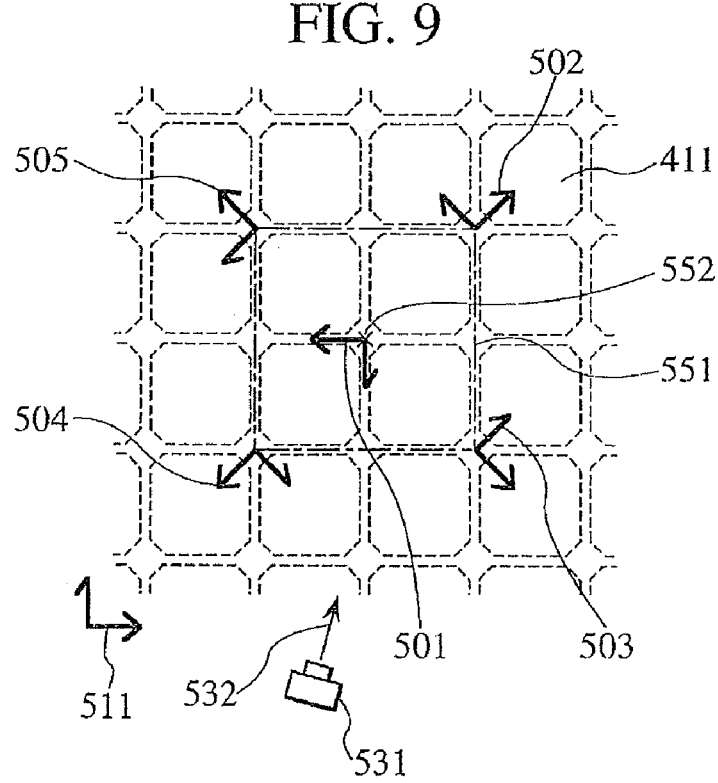
FIG. 9 An explanatory diagram summarizing arrangement information.

Viewing FIG. 9 corresponding to FIG. 5, the local coordinate system 501 is arranged near the center 552 of the square 551 (indicated by broken lines in FIG. 9). In addition, the local coordinate systems 502, 503, 504, and 505 are arranged at the vertices of the square 551, and the respective z axes thereof are facing the direction away from the center 552 of the square 551, thereby producing an arrangement that gives the overall impression of being spread-out.

Figure 10:
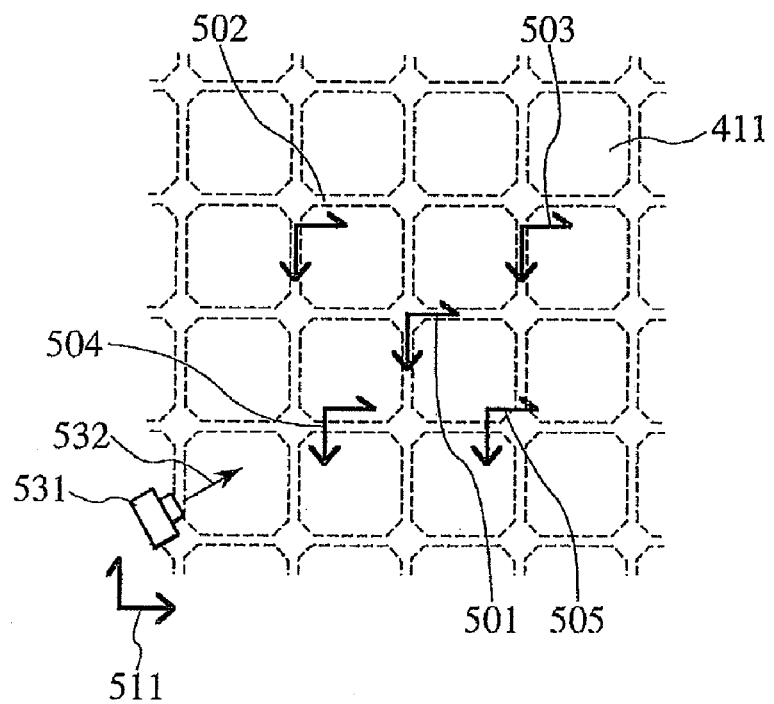
FIG. 10 An explanatory diagram summarizing arrangement information.
Figure 11:
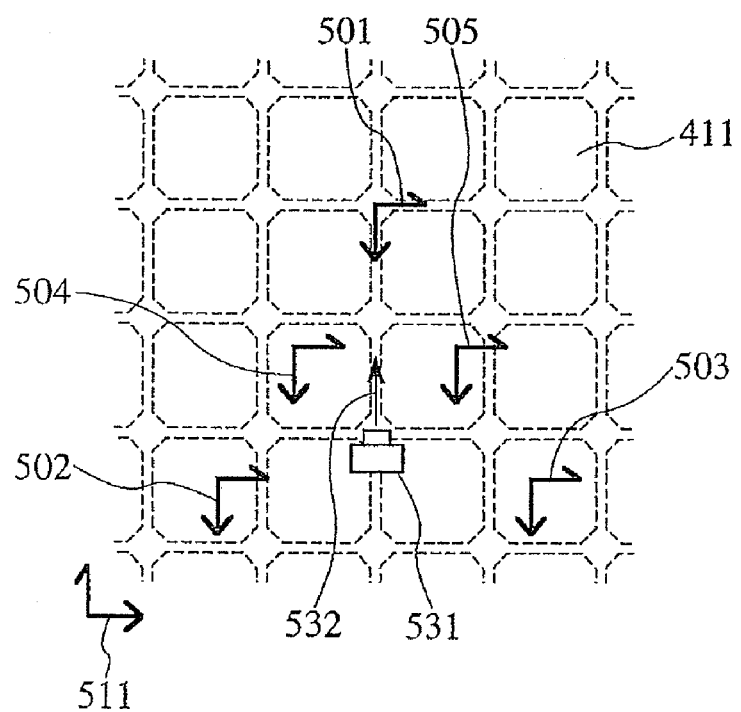
FIG. 11 An explanatory diagram summarizing arrangement information.

In FIG. 10 corresponding to FIG. 6, the arrangement of the local coordinate systems 501 to 505 is similar to the case of FIG. 9, but wherein the orientations of the local coordinate systems 501 to 505 are mutually parallel, thereby producing an arrangement that gives the overall impression of being orderly.

Figure 7:
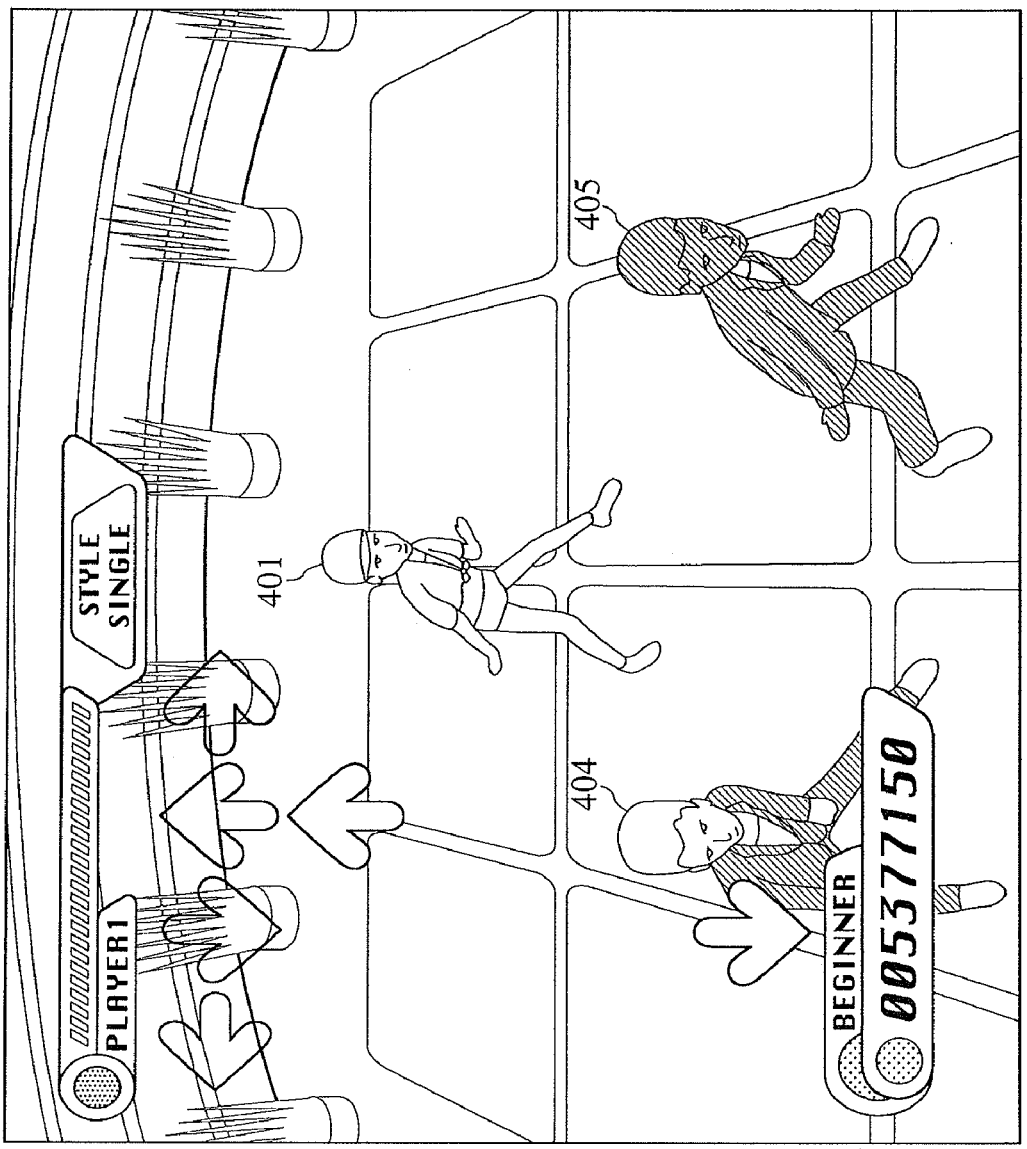
FIG. 7 An explanatory diagram illustrating an image expressing characters arranged in a virtual space on the basis of arrangement information.

In FIG. 7, only three characters are displayed on-screen: the hat-wearing character 401, the black-clothed, black-haired character 405, and the black-clothed, white-haired character 404. Viewing FIG. 11, the local coordinate systems 501 to 505 are arranged in a reverse V, except that the local coordinate systems 502 and 503 are arranged to exist behind the perspective position 531. For this reason, the white-clothed, white-haired character 402 and the white-clothed, black-haired character 403 are not displayed on-screen.

A variety of other arrangements of local coordinate systems are conceivable according to variations in choreography on stage. For example, in arrangement information expressing conditions like those of a line dance, the local coordinate systems may be arranged to be mutually parallel, with the origins of each local coordinate system at equal intervals on a line.

In addition, in arrangement information expressing conditions like those of Bon Odori, the origins of the local coordinate systems are arranged circularly and at equal intervals, and the orientations of the local coordinate systems (for example, the z axes) are made to touch the circumference of the circle.

Other than the above, in arrangement information expressing conditions like those of a pop idol group wherein a single person sings a song while the other members watch the singer, the z axes of the local coordinate systems arranged at the periphery are set to face the center, opposite to that of FIG. 9.

In the present embodiment, a plurality of arrangement information is prepared as shown in FIGS. 8 to 11. More specifically, each set of arrangement information stores information like the following:

(1) the coordinate value of the perspective position 531, the directional vector value of the perspective direction 532, and the distance between the projection plane and the perspective position 531;

(2) the positions and orientations of the local coordinate systems associated with each character (i.e., the local coordinate systems 501 to 505), relative to the global coordinate system (i.e., the coordinate system fixed to the floor 411); and (3) various other information defining the state of the virtual space. For example, information on objects arranged in the virtual space, and information on the positions, orientations, and types of light sources illuminating the virtual space. This information may be the same or mutually different for each set of arrangement information.

Next, the posture storage unit 304 stores, in association with elapsed time, coordinate groups expressing positions and postures of characters in the local coordinate systems that determine the reference positions and reference orientations of the characters.

FIG. 12 is an explanatory diagram summarizing coordinate groups expressing the character postures in FIGS. 4 to 7. FIGS. 12(a), 12(b), 12(c), and 12(d) respectively correspond to the postures of the characters in FIGS. 4, 5, 6, and 7. Hereinafter, a description will be given with reference to FIG. 12.

In FIG. 12, in order to ease understanding, the character 401 and the local coordinate system 501 will be described by way of example. However, it should be appreciated that similar discussion can be applied to other combinations of characters and coordinate systems.

Figure 12A:
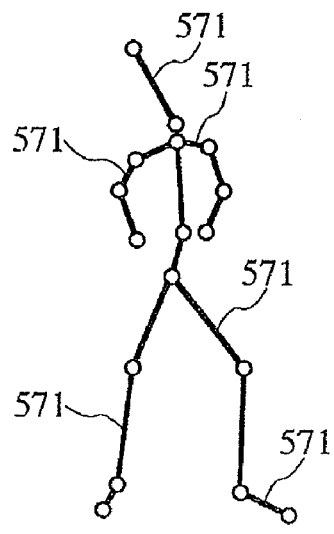
FIG. 12 (a) is an explanatory diagram summarizing a coordinate group expressing the postures of the characters shown in FIG. 4; (b) is an explanatory diagram summarizing a coordinate group expressing the postures of the characters shown in FIG. 5; (c) is an explanatory diagram summarizing a coordinate group expressing the postures of the characters shown in FIG. 6; and (d) is an explanatory diagram summarizing a coordinate group expressing the postures of the characters shown in FIG. 7.
Figure 12B:
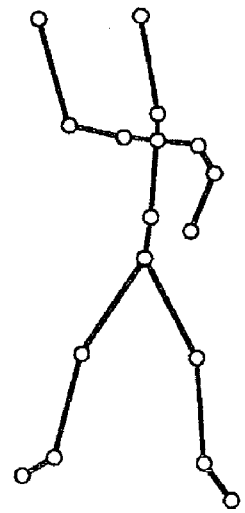
Figure 12C:
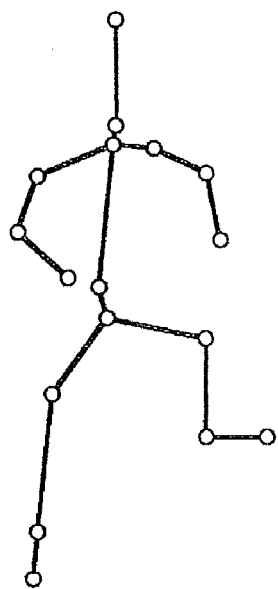
Figure 12D:
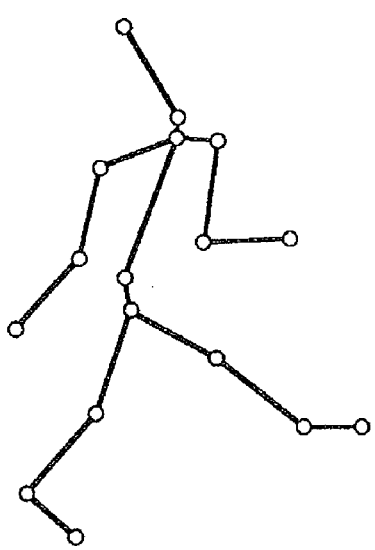

The posture of the character 401 is defined by the relative positions and orientations of bones 571 corresponding to the bones (i.e., the skeleton) of the hat-wearing character 401 with respect to the local coordinate system for the hat-wearing character 501. (In FIG. 12, bones are represented by thick line segments capped by white circles. In addition, in order to ease understanding, only a portion of the bones in FIG. 12(a) are labeled with reference numbers.) It is typically to apply the following constraints: the length of each bone 571 is fixed, and adjacent bones 571 are joined at their endpoints.

Consequently, the shape of all bones 571 is determined by taking one bone 571 to be a reference bone, and then determining only the orientations relative to adjacent bones 571 for all other bones 571.

Surrounding the bones 571, there are arranged control points for determining the outer appearance of the character 401. These control points are arranged at positions fixed relative to one of the bones 571, and thus when the position or orientation of the bones 571 are changed, the positions of the control points change in conjunction with the bones 571.

By taking the control points to be polygon vertices or NURBS control points, a skin expressing the external shape (i.e., the skin) of the character 401 is determined. By pasting corresponding textures onto this skin, an image of the character 401 shown in FIG. 4 and elsewhere is obtained. In FIG. 4, the character 401 takes a posture with hands on hips and the left leg slightly extended to the left. Meanwhile, in FIG. 12(a), the overall bones 571 form a positional relationship identical to that of the character 401, and arranged so as to face in the nearly the same direction as the z axis of the local coordinate system 501.

Meanwhile, in FIG. 5, the character 401 is raising his or her right hand. Consequently, in FIG. 12(b), the bone 571 corresponding to the right hand is raised highly upward in a similar manner.

In FIG. 6, the character 401 takes a posture with the right hand and the left hand extended forward, and stepping with the left leg. Similarly, in FIG. 12(c), the overall bones 571 take on the same shape.

In FIG. 7, the character 401 is extending the left leg and bending the right leg, putting his or her body weight onto the right leg, extending the right hand backwards, and bending the left hand. Similarly, in FIG. 12(d), the positions and orientations of each bone 571 are determined such that the overall bones 571 take on the same shape.

Thus, a coordinate group expressing a position and posture is information determining the positions and orientations of the bones 571 with respect to the local coordinate system 501. By varying this coordinate group over time, motion causing the character 401 to dance, for example, can be applied.

In the posture storage unit 304, coordinate groups corresponding to the single character 401 are stored in association with elapsed time. These are collectively referred to as the motion information for the character 401. In order to smoothly and naturally vary the posture of the character 401, it is necessary to raise the precision of the motion information. In other words, the width of the elapsed time slices are made small, while the number of bones 571 is increased.

Consequently, if motion information is prepared for each character, the data size becomes large.

In the present invention, since the motion information for the character 401 is identically applied to the characters 402 to 405, the data size can be curtailed.

In addition, the positions and orientations of the local coordinate systems 501 to 505 are determined with respect to the global coordinate system by the arrangement information. Coordinate values contained in the motion information for the character 401 are considered to be coordinate values in the local coordinate system 501. By orthogonally transforming these values into the global coordinate system, the position and posture of the character 401 with respect to the floor 411 is determined.

Similarly, in order to obtain the respective positions and postures of the characters 402, 403, 404, and 405 with respect to the floor 411, the coordinate values contained in the motion information for the character 401 may be orthogonally transformed such that the coordinate values are moved and rotated to the same degree as the positions and orientations of the local coordinate systems 502, 503, 504, and 505 with respect to the global coordinate system.

Herein, an orthogonal transformation means a translation, rotation, reflection (i.e., mirror transformation), or similar coordinate transformation wherein the distances between points is not changed by the transformation. In the above arrangement information, reflections (i.e., mirror transformations) are not included, but if the local coordinate system is changed from a right-handed system to a left-handed system, then the postures of two characters come to exist in a mirror relationship.

In the present embodiment, in order to ease understanding, is it assumed that the postures are varied for the characters 401 to 405 sharing a common size for each set of bones 571. However, it is also possible to apply the present invention to cases wherein the size of each set of bones 571 differs for each character. For example, if the coordinate values in the motion information for the character 401 are enlarged or reduced, then the motion information can be adapted to a large character or a small character, and by performing an affine transformation, the external shape of a character can made thin or fat.

In addition, there is another technique wherein only the relative positional relationships of the bones 571 are used. In other words, the orientation taken by a corresponding bone 571 with respect to an adjacent bone 571 is common for each character. In this case, by changing the length of each bone 571 for each character, features such as the height and arm and leg length of the characters can be diversified.

FIG. 13 is a flowchart illustrating the control flow for character display processing executed by a character display 301 in accordance with the present embodiment. Hereinafter, a description will be given with reference to FIG. 13.

When the present process is initiated, the CPU 101 initializes the RAM 103 (step S901). In addition to arrangement information and posture information, information such as skin control point information and texture information required to express the state within the virtual space are typically recorded onto the DVD-ROM or other medium. For this reason, processing for reading the above information into the RAM 103 via the DVD-ROM drive 108, processing for acquiring the current time and enabling calculation of the elapsed time since the start of the present process, and processing for instructing the audio processor 110 to read MIDI data and start music playback, for example, may be conducted at the time of initialization.

Next, the CPU 101 selects one set of arrangement information from among the prepared arrangement information in the RAM 103 (step S902). Consequently, the CPU 101 cooperates with the RAM 103 to function as the arrangement selector 303. The arrangement information may be selected randomly, or, in the case where cyclical order is determined in advance, arrangement information corresponding to the "lead" may be selected.

In addition, as described hereinafter, arrangement information is re-selected when a predetermined break in a bar of music being simultaneously played back is reached, or when the user presses a predetermined key or button, for example.

Next, the CPU 101 measures the elapsed time since starting the process (step S903). The elapsed time may be acquired by calculating the difference between the time acquired in step S901 and the current time, or by querying the audio processor 110 how much time has elapsed since the start of MIDI data playback.

Subsequently, the CPU 101 acquires the coordinate group associated with the current elapsed time from among the prepared posture information in the RAM 103 (step S904). Consequently, the CPU 101 cooperates with the RAM 103 to function as the posture acquirer 305.

Next, on the basis of the local coordinate systems 501 to 505 of the characters 401 to 405 defined in the arrangement information obtained in step S902, as well as on the basis of the relative position and orientation relationships in the global coordinate system 511, the CPU 101 orthogonally transforms the coordinate group obtained in step S904, thereby acquiring coordinate groups expressing the positions and orientations of the bones 571 in the global coordinate system 511 for each character 401 to 405 (step S905). Consequently, the CPU 101 cooperates with the RAM 103 to function as the mover/rotator 306. It is also possible to conduct the above coordinate transformations at high speeds by using the graphics processor provided in the image processor 107.

As described above, in the arrangement information, the reference positions and reference orientations of the characters 401 to 405 are defined by the local coordinate systems 501 to 505. Consequently, the coordinate group expressing the postures of the characters 401 to 405 is treated as a collection of coordinate values in the local coordinate systems 501 to 505, and coordinate values in the global coordinate system 511 are calculated.

In so doing, the positions and orientations of the bones 571 for the characters 401 to 405 are determined. For this reason, the CPU 101 itself calculates, or issues instructions to the graphics processor of the image processor 107 to do the following: calculate the positions of the skin control points of each character in the global coordinate system 511, determine the texture pasting positions from the positions of the skin control points, and then use the information of the perspective position 531 and the perspective direction 532 (and, in the case wherein perspective projection is used, the distance to the projection plane) defined in the selected arrangement information to generate an image of the characters 401 to 405 arranged in the virtual space (step S906).

In the case where information such as object information or light information in the virtual space is defined for each set of arrangement information, the current arrangement information is referenced to generate an image. Alternatively, if the above information is common for all arrangement information, then that information is referenced. The above information is primarily used in the case of generating an image of the background of the characters 401 to 405.

The image generated at this point is then stored in the RAM 103.

Next, the process waits until the a vertical sync interrupt is generated (step S907). During this waiting period, it is possible to execute other processing as co-routines.

Then, when a vertical sync interrupt is generated, the image in the RAM 103 is forwarded to the frame memory, instructions are issued to the image processor 107, and the image is actually displayed on-screen on a monitor (step S908).

Consequently, the CPU 101 cooperates with the RAM 103 and the image processor 107 to function as the generating/displaying unit 307.

Subsequently, the CPU 101 determines whether or not it is necessary to re-select arrangement information (step S909). If re-selection is necessary (step S909; Yes), the process returns to step S902. If re-selection is unnecessary (step S909; No), the process returns to step S903. More specifically, the following techniques are conceivable.

The first technique involves re-selecting arrangement information in the case where there is instructional operation of the controller 105 by the user. In a game that can be displayed in 3D, the L1 button 215 and the L2 button 216 of the controller 105 are often used to switch perspective (i.e., the camera).

In the present embodiment, since the perspective position 531 and the perspective direction 532 are included in the arrangement information, switching the perspective (camera) directly corresponds to switching the arrangement information.

In this case, the cyclical order is applied to the arrangement information, such that if the L1 button 215 is pressed, then the "Next" arrangement information is selected in step S902, and if the L2 button 216 is pressed, then the "Previous" arrangement information if selected in step S902, for example.

In addition, also used in the game is a technique that uses the joysticks 213 and 214 in order to finely adjust the position and orientation of the perspective (camera). In the present embodiment, the perspective position 531 and the perspective direction 532 of the currently selected arrangement information may be varied and updated according to the operation of the joysticks 213 and 214, and by an amount corresponding to the operation thereof.

A second technique involves re-selecting arrangement information in time with breaks in the bars of a song. In MIDI information, the playback tempo is explicitly stated, and the tones, pitches, and lengths of playback sounds are specified in units of musical bars. In addition, MIDI information also includes extension commands allowing free extension by the user. Consequently, an "arrangement information re-select" command is prepared as one of these extension commands.

The arrangement information re-select command inserts musical breaks in advance, such as at every four or eight bars, for example. Then, at timings corresponding to when the bar breaks disposed by the arrangement information re-select command are reached, the audio processor 110 issues instructions to the CPU 101 to re-select the arrangement information.

For example, the above may be realized by a technique wherein the audio processor 110 establishes an arrangement information re-select flag in a flag area inside the RAM 103, such that when the CPU 101 conducts re-selection, the arrangement information re-select flag is cleared.

When implementing the present technique, the motion information can also be further utilized. For example, consider MIDI data wherein the maximum interval between arrangement information re-select commands is eight bars, and thus wherein arrangement information re-select commands are disposed at intervals shorter than the above.

In this case, the time the characters dance in the same arrangement is a maximum of eight bars of time.

Consequently, motion information having the maximum interval (in the above example, eight bars of time) is plurally prepared as the motion information stored in the posture storage unit 304. This motion information corresponds to segments of choreographic units, such as that referred to as figures (steps) in social dance. Subsequently, when the arrangement information is re-selected, the motion information is re-selected randomly (or in a predetermined order), and the posture acquirer 305 acquires, in the motion information, the coordinate group of the postures associated with associated with the elapsed time since the motion information was re-selected. In other words, when the arrangement information is re-selected, a new choreographic segment is initiated.

When arrangement information is re-selected, parameters such as the arrangement and perspective position are switched. For this reason, even if the dance choreography is not continuous, the degree to which an unnatural impression is imparted to the audience is low. In contrast, it is possible to increase dance variations by continuing an unbroken sequence of simple choreographic units.

A third technique involves defining the time segments adopted by the arrangement information in the arrangement information itself. In other words, particular arrangement information is adopted between the elapsed times xx sec to xx sec, yy sec to yy sec, and so on.

The present technique does not randomly generate dance choreography, and thus is preferable in the case where, for example, it is desirable to show the user moving images that are fixed to a certain degree, such as a video clip.

Herein, it is desirable to make the time segments for each set of arrangement information mutually non-overlapping and such that there are no gaps when joining all time segments. However, techniques may be adopted such that, in the case of overlap, a segment may be randomly selected from among the overlapping segments, for example. In the case where a gap occurs, a segment may be randomly selected from all arrangement information, for example.

In this way, the processing in the posture acquirer 305, the mover/rotator 306, and the generating/displaying unit 307 is repeated according to the vertical sync interrupt period, thereby displaying video showing a plurality of characters varying postures with elapsed time.

According to the present embodiment, since each character takes the same posture, the data size of the motion information can be reduced, and since the posture of each character is obtained by orthogonal transformations that can be calculated with hardware assistance, for example, the calculation load is small. Moreover, changes in position and orientation can be effected using a variety of arrangement information, and since the arrangement information is switched at suitable timings, it is possible to attract user interest.

Hereinafter, various modifications of the foregoing embodiment will be described in sequence.

Embodiment 2

Figure 14A:
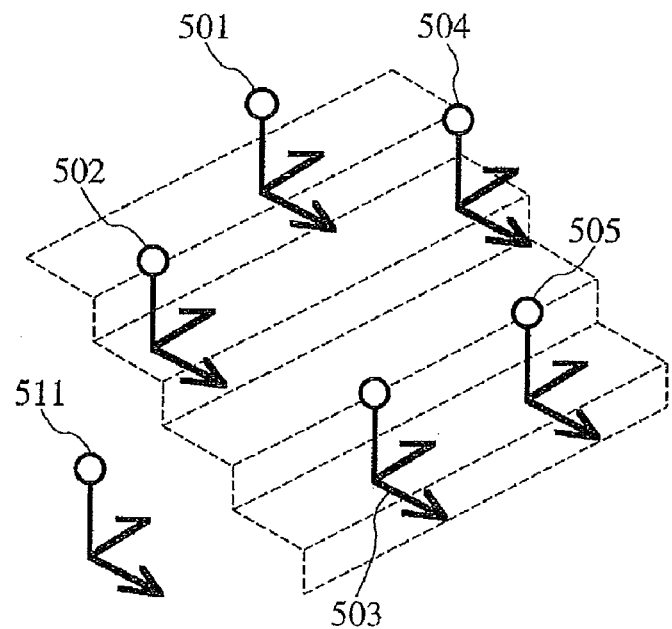
FIG. 14 An explanatory diagram summarizing arrangement information.
Figure 14B:
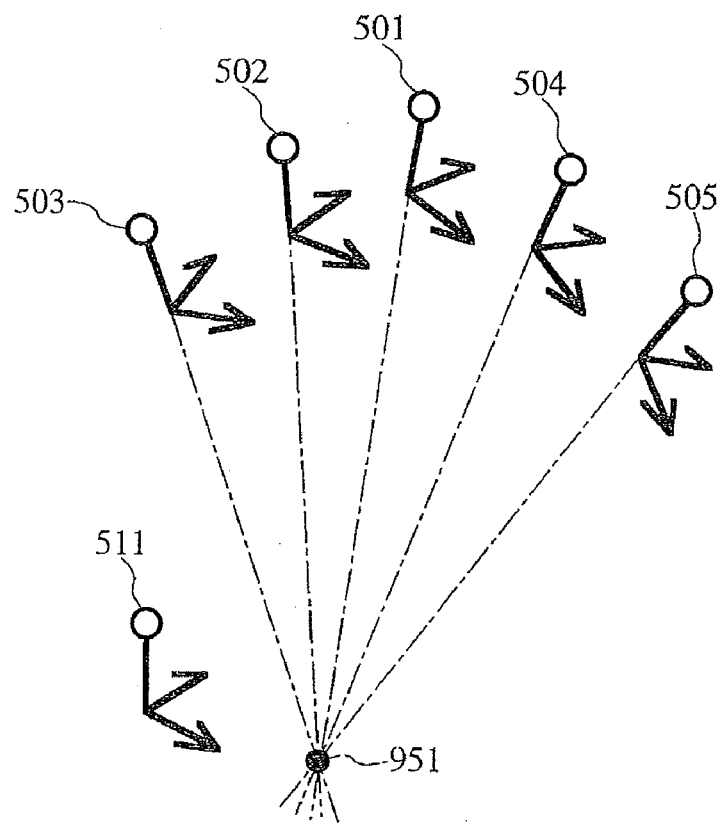

In the example of the foregoing arrangement information, the origins of the coordinate systems are all in a plane corresponding to the floor 411. However, the positional relationships of the origins may also be varied. FIG. 14 is an explanatory diagram illustrating the states of such various arrangement information. Hereinafter, a description will be given with reference to FIG. 14. In FIG. 14, white circles are drawn at the tips of the x axes.

FIG. 14(*a*) depicts the state of arrangement information in the case where the characters are arranged on a stepped stage. The floor 411 has a stepped shape, and the local coordinate systems 501 to 505 are arranged at positions with different heights in the global coordinate system 511.

In addition, in the example of the foregoing arrangement information, the x axes of each coordinate system are arranged in parallel. This corresponds to gravity working in a fixed direction. However, in cases considering character behavior underwater or in weightless spaces, the effects of gravity become smaller, and thus such cases are not limited to the above.

For example, as shown in FIG. 14(*b*), the x axes of the local coordinate systems 501 to 505 adopt an arrangement that converges on a certain distant point 951. This corresponds to conditions wherein the characters are standing on a spherical iron floor 411 in a weightless space using magnetic shoes, for example.

Embodiment 3

In the foregoing embodiment, when arrangement information is newly selected, an image with an updated arrangement of the character 401 is immediately displayed on-screen. However, a still image or video prepared in advance may also be displayed starting from when the arrangement information is switched and lasting until a predetermined transition time elapses.

For example, when switching arrangement information, a still image painted completely black, or a video depicting lightning crashing or an explosion, for example, may be displayed for an extremely short amount of time.

In the case where the switching of the perspective and the switching of the arrangement information are linked, then various video may be displayed as the transition video, such as displaying video as if a film strip were moving vertically, as if a lens filter were being exchanged, or as if the focus were being adjusted.

In so doing, a grace period of a fixed amount of time for varying the character arrangement is provided, thereby making it possible to reduce the degree to which an impression as if the characters moved instantaneously is imparted to the user.

Embodiment 4

As described earlier, the character display 301 can be configured to be provided with the emphasis identifier 308 and the arrangement exchanger 309. The CPU 101 cooperates with the RAM 103 and the image processor 107 to function as the emphasis identifier 308 and the arrangement exchanger 309.

In the present embodiment, each set of arrangement information is made to include information indicating which character among the plurality of characters is the main character.

For example, in a dancing group, it is typical for the character featured most prominently to be arranged in the center. Consequently, such a character that is featured most prominently may be taken to be the main character, and information may be defined indicating which is the main character among the characters whose positions and orientations are defined in the arrangement information.

In the examples shown in FIGS. 4 to 7, the hat-wearing character 401 is positioned in the center of the character arrangement (such as the vertex of the V or the center of the square) in all cases. Consequently, in the present embodiment, information indicating that the main character is the hat-wearing character 401 is recorded in the corresponding arrangement information.

With that, the emphasis identifier 308 identifies, from among the plurality of characters, the emphasized character as being projected closest to a predetermined emphasized position in the generated image.

It is typical for the screen center to be adopted as the predetermined emphasized position, but locations other than this may also be selected.

In the case where the screen center is taken to be the predetermined emphasized position, the emphasized character becomes the character among the characters 401 to 405 with the shortest distance to the line segment extending from the perspective position 531 in the perspective direction 532. In the case where a plurality of characters are arranged in the screen center, the character closest to the perspective position 531 may be taken to be the emphasized character.

For example, in the display examples shown in FIGS. 4, 5, and 7, the emphasized character is the hat-wearing character 401, but in the display example shown in FIG. 6, the emphasized character is the black-clothed, white-haired character 404.

Herein, the main character corresponds to the performer considered to be the one that the entertainment provider wants to emphasize to the customer, while the emphasized character corresponds to the performer that the customer is actually focusing on.

Typically, in entertainment performed by a group, it is not just the main character of the group who is popular. Instead, in many cases fans are also established around other members. Consequently, the case wherein the emphasized character is not the main character corresponds to the case wherein "a fan of another member" is watching the screen.

For example, in the foregoing embodiment, the spectator may use the controller 105 to conduct an operation to point the perspective direction at a character among the five characters other than the hat-wearing character 401 who is the main character. At this point, it is thought that the spectator is focusing on a character other than the main character. In such cases, the present embodiment rearranges the emphasized character to a prominent location, thereby further attracting the interest of the spectator.

In other words, when a single set of arrangement information is selected from among the stored plurality of arrangement information by instructional input from the user, the arrangement exchanger 309 exchanges the reference position and reference orientation of the emphasized character identified immediately prior to the selection with the reference position and reference orientation of the main character in the selected arrangement information.

At this point, the arrangement exchanger 309 may also be configured so as to mutually and randomly exchange the reference positions and reference orientations of characters other than the emphasized character.

Since the emphasized character is the character that the user is assumed to be focusing on, it may be desirable, depending on the application, to arrange the emphasized character in a position where that character will be emphasized even when the character arrangement is varied.

Consequently, in order to arrange the immediately previous emphasized character at the position and orientation of the main character in the new arrangement information, the positions and orientations of the emphasized character and the main character are exchanged. In other words, among the local coordinate systems 501 to 505, the information associated with the main character and the information associated with the emphasized character may be exchanged.

According to the present invention, the character that the user is assumed to be focusing on is arranged at a position where it is assumed that the character will continue to be emphasized, even if the arrangement information is switched. For this reason, discomfort felt by the user can be reduced.

In addition, if the positions of characters that the user is assumed to not be focusing on are randomly exchanged with each other, the diversity of the on-screen display is increased, and the interest of the user can be attracted.

The present application claims priority on the basis of Japanese Patent Application No. 2007-146500 (filed Jun. 1, 2007), the content of which is hereby incorporated to the extent allowed by the laws of the designated countries.

Industrial Applicability

As described above, according to the present invention, a character display and a character displaying method can be provided, as well as a computer-readable information recording medium having recorded thereon a program for realizing the above on a computer, as well as the program itself, the above being optimal for attracting user interest by increasing the variety of on-screen display while reducing data processing by making the time variation of posture common among a plurality of characters.

The invention claimed is:
1. A character display, comprising:
an arrangement storage unit that plurally stores arrangement information defining reference positions and reference orientations in a virtual space for each of a plurality of characters and defining a main character from among the plurality of characters;

an arrangement selector that selects one set of arrangement information from among the stored plurality of arrangement information;

a posture storage unit that stores coordinate groups expressing the positions and postures of characters relative to the reference positions and reference orientations in association with elapsed time;

a posture acquirer that acquires, from among the stored coordinate groups, the coordinate group stored in association with the elapsed time from a predetermined time to the present;

a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;

an emphasis identifier that identifies, from among the plurality of characters one of the plurality of characters as an emphasized character;

a generating/displaying unit that uses the calculated coordinate group expressing the respective positions and postures of the plurality of characters to generate an image wherein the characters are arranged in the virtual space, and then displays the generated image; and an arrangement exchanger, configured such that when the arrangement information is selected, the reference position and reference orientation of the emphasized character is exchanged with the reference position and reference orientation of the main character, the generating/displaying unit being further configured to generate a second image wherein the characters are arranged in the virtual space using the exchanged reference position and reference orientation, the arrangement exchanger being further configured such that the reference positions and reference orientations of the characters other than the emphasized character are also randomly exchanged with each other.

2. The character display according to claim 1, wherein, upon selection of the arrangement information and until a predetermined transition time elapses, the generating/displaying unit displays a still image or video prepared in advance instead of displaying the generated image.

3. The character display according to claim 1, wherein
each set of arrangement information in the stored plurality of arrangement information is also associated with background information defining objects and light sources arranged in the virtual space, and
the generating/displaying unit generates an image wherein the objects defined in the background information associated with the selected arrangement information are arranged in the virtual space behind the plurality of characters, and wherein the objects and the characters are illuminated by the light sources defined in the background information.

4. The character display according to claim 1, wherein
mutually non-overlapping time segments are additionally associated with each set of arrangement information in the plurality of stored arrangement information, and
the arrangement selector selects, from among the stored plurality of arrangement information, arrangement information containing the elapsed time from a predetermined time to the present for an associated time segment.

5. The character display according to claim 4, wherein
perspective points and perspective directions in the virtual space are additionally associated with each set of arrangement information in the plurality of stored arrangement information, and
the generating/displaying unit projects an image using the perspective point and perspective direction associated with the selected arrangement information, thereby generating an image wherein the plurality of characters are arranged in the virtual space.

6. The character display according to claim 1, wherein the arrangement selector selects arrangement information from among the plurality of stored arrangement information according to instructional input from the user.

7. The character display according to claim 6, wherein
perspective positions and perspective directions in the virtual space are additionally associated with each set of arrangement information in the stored plurality of arrangement information,
the instructional input from the user is instructional input specifying one of the perspective positions and one of the perspective directions associated with each set of arrangement information in the stored plurality of arrangement information,
the arrangement selector selects, from among the stored plurality of arrangement information, the arrangement information associated with the perspective position and the perspective direction specified by the instructional input from the user, and
the generating/displaying unit projects an image using the perspective position and the perspective direction associated with the selected arrangement information, thereby generating an image wherein the plurality of characters are arranged in the virtual space.

8. The character display according to claim 6, wherein the main character for a set of arrangement information is additionally associated with each set of arrangement information in the stored plurality of arrangement information, and the emphasis identifier identifies the character, from among the plurality of characters, projected closest to a predetermined emphasized position in the generated image as the emphasized character.

9. A character display according to claim 1, the arrangement selector being configure to selectively select one set of arrangement information from among the stored plurality of arrangement information automatically or in response to user input.

10. A character displaying method that, when executed, references an arrangement storage unit storing a plurality of arrangement information defining reference positions and reference orientations in a virtual space for each of a plurality of characters and defining a main character from among the plurality of characters, and a posture storage unit storing coordinate groups expressing character positions and postures relative to the reference positions and reference orientations in association with elapsed time, the method comprising:

an arrangement selecting step that selects one set of arrangement information from among the stored plurality of arrangement information;

a posture acquiring step that acquires, from among the stored coordinate groups, a coordinate group stored in association with the elapsed time from a predetermined time to the present;

a moving/rotating step that performs orthogonal transformations for each character in the plurality of characters defined by the selected arrangement information and with respect to a coordinate group obtained from the reference positions and reference orientations defined for the characters in the arrangement information, and then takes the obtained coordinate group to be the coordinate group expressing the positions and orientations of the characters in the virtual space;

an emphasis identifier step that identifies, from among the plurality of characters one of the plurality of characters as an emphasized character;

a generating/displaying step that uses the calculated coordinate group expressing the respective positions and postures of the plurality of characters to generate an image wherein the characters are arranged in the virtual space, and then displays the generated image; and an arrangement exchanger step that, when the arrangement information of one of the characters is selected as a main character, exchanges the reference position and reference orientation of the emphasized character with the reference position and reference orientation of the main character and randomly exchanges the reference positions and reference orientations of the characters other than the emphasized character with each other; and a second generating/displaying step to generate a second image wherein the characters are arranged in the virtual space using the exchanged reference position and reference orientation.

11. A character displaying method according to claim 10, the arrangement selecting step including the step of selectively selecting one set of arrangement information from among the stored plurality of arrangement information automatically or in response to user input.

12. A non-transitory computer-readable information recording medium having recorded thereon a program that causes a computer to function as:

an arrangement storage unit that plurally stores arrangement information defining reference positions and reference orientations in a virtual space for each of a plurality of characters;

an arrangement selector that selects one set of arrangement information from among the stored plurality of arrangement information;

a posture storage unit that stores coordinate groups expressing the positions and postures of characters relative to the reference positions and reference orientations in association with elapsed time;

a posture acquirer that acquires, from among the stored coordinate groups, the coordinate group stored in association with the elapsed time from a predetermined time to the present;

a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;

an emphasis identifier that identifies, from among the plurality of characters one of the plurality of characters as an emphasized character;

a generating/displaying unit that uses the calculated coordinate group expressing the respective positions and postures of the plurality of characters to generate an image wherein the characters are arranged in the virtual space, and then displays the generated image; and an arrangement exchanger, configured such that when the arrangement information of one of the characters is selected as a main character, the reference position and reference orientation of the emphasized character is exchanged with the reference position and reference orientation of the main character, the generating/displaying unit being further configured to generate a second image wherein the characters are arranged in the virtual space using the exchanged reference position and reference orientation, the arrangement exchanger being further configured such that the reference positions and reference orientations of the characters other than the emphasized character are also randomly exchanged with each other.

13. A non-transitory computer-readable information recording according to claim 12, the arrangement selector being configure to selectively select one set of arrangement information from among the stored plurality of arrangement information automatically or in response to user input.

14. A computer program product embodied on a non-transitory computer readable medium that causes a computer to function as:

an arrangement storage unit that plurally stores arrangement information defining reference positions and reference orientations in a virtual space for each of a plurality of characters and defining a main character from among the plurality of characters;

an arrangement selector that selects one set of arrangement information from among the stored plurality of arrangement information;

a posture storage unit that stores coordinate groups expressing the positions and postures of characters relative to the reference positions and reference orientations in association with elapsed time;

a posture acquirer that acquires, from among the stored coordinate groups, the coordinate group stored in association with the elapsed time from a predetermined time to the present;

a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;

an emphasis identifier that identifies, from among the plurality of characters one of the plurality of characters as an emphasized character;

a generating/displaying unit that uses the calculated coordinate group expressing the respective positions and postures of the plurality of characters to generate an image wherein the characters are arranged in the virtual space, and then displays the generated image; and an arrangement exchanger, configured such that the arrangement information of one of the characters is selected as a main character, the reference position and reference orientation of the emphasized character is exchanged with the reference position and reference orientation of the main character, the generating/displaying unit being further configured to generate a second image wherein the characters are arranged in the virtual space using the exchanged reference position and reference orientation, the arrangement exchanger being further configured such that the reference positions and reference orientations of the characters other than the emphasized character are also randomly exchanged with each other.

15. A computer program product embodied on a non-transitory computer readable medium according to claim 14, the arrangement selector being configure to selectively select one set of arrangement information from among the stored plurality of arrangement information automatically or in response to user input.

16. A character display, comprising:
an arrangement storage unit that plurally stores arrangement information defining reference positions and reference orientations in a virtual space for each of a plurality of characters and defining a main character from among the plurality of characters;
an arrangement selector that selects one set of arrangement information from among the stored plurality of arrangement information;
a posture storage unit that stores coordinate groups expressing the positions and postures of characters relative to the reference positions and reference orientations in association with elapsed time;
a posture acquirer that acquires, from among the stored coordinate groups, the coordinate group stored in association with the elapsed time from a predetermined time to the present;
a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;
an emphasis identifier that identifies, from among the plurality of characters one of the plurality of characters as an emphasized character;
a generating/displaying unit that uses the calculated coordinate group expressing the respective positions and postures of the plurality of characters to generate an image wherein the characters are arranged in the virtual space, and then displays the generated image; and
an arrangement exchanger, configured such that when the arrangement information is selected, the reference position and reference orientation of the emphasized character is exchanged with the reference position and reference orientation of the main character, the generating/displaying unit being further configured to generate a second image wherein the characters are arranged in the virtual space using the exchanged reference position and reference orientation.

17. A character displaying method that, when executed, references an arrangement storage unit storing a plurality of arrangement information defining reference positions and reference orientations in a virtual space for each of a plurality of characters and defining a main character from among the plurality of characters, and a posture storage unit storing coordinate groups expressing character positions and postures relative to the reference positions and reference orientations in association with elapsed time, the method comprising:
an arrangement selecting step that selects one set of arrangement information from among the stored plurality of arrangement information;
a posture acquiring step that acquires, from among the stored coordinate groups, a coordinate group stored in association with the elapsed time from a predetermined time to the present;
a moving/rotating step that performs orthogonal transformations for each character in the plurality of characters defined by the selected arrangement information and with respect to a coordinate group obtained from the reference positions and reference orientations defined for the characters in the arrangement information, and then takes the obtained coordinate group to be the coordinate group expressing the positions and orientations of the characters in the virtual space;
an emphasis identifier step that identifies, from among the plurality of characters one of the plurality of characters as an emphasized character;
a generating/displaying step that uses the calculated coordinate group expressing the respective positions and postures of the plurality of characters to generate an image wherein the characters are arranged in the virtual space, and then displays the generated image; and
an arrangement exchanger step that, when the arrangement information of one of the characters is selected as a main character, exchanges the reference position and reference orientation of the emphasized character with the reference position and reference orientation of the main character; and
a second generating/displaying step to generate a second image wherein the characters are arranged in the virtual space using the exchanged reference position and reference orientation.

18. A non-transitory computer-readable information recording medium having recorded thereon a program that causes a computer to function as:
an arrangement storage unit that plurally stores arrangement information defining reference positions and reference orientations in a virtual space for each of a plurality of characters;
an arrangement selector that selects one set of arrangement information from among the stored plurality of arrangement information;
a posture storage unit that stores coordinate groups expressing the positions and postures of characters relative to the reference positions and reference orientations in association with elapsed time;
a posture acquirer that acquires, from among the stored coordinate groups, the coordinate group stored in association with the elapsed time from a predetermined time to the present;
a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;
an emphasis identifier that identifies, from among the plurality of characters one of the plurality of characters as an emphasized character;
a generating/displaying unit that uses the calculated coordinate group expressing the respective positions and postures of the plurality of characters to generate an image wherein the characters are arranged in the virtual space, and then displays the generated image; and an arrangement exchanger, configured such that when the arrangement information of one of the characters is selected as a main character, the reference position and reference orientation of the emphasized character is exchanged with the reference position and reference orientation of the main character, the generating/displaying unit being further configured to generate a second image wherein the characters are arranged in the virtual space using the exchanged reference position and reference orientation.

19. A computer program product embodied on a non-transitory computer readable medium that causes a computer to function as:
   an arrangement storage unit that plurally stores arrangement information defining reference positions and reference orientations in a virtual space for each of a plurality of characters and defining a main character from among the plurality of characters;
   an arrangement selector that selects one set of arrangement information from among the stored plurality of arrangement information;
   a posture storage unit that stores coordinate groups expressing the positions and postures of characters relative to the reference positions and reference orientations in association with elapsed time;
   a posture acquirer that acquires, from among the stored coordinate groups, the coordinate group stored in association with the elapsed time from a predetermined time to the present;
   a mover/rotator that, for each character in the plurality of characters defined by the selected arrangement information, performs orthogonal transformations with respect to a coordinate group obtained from the reference positions and reference orientations defined for the characters in the arrangement information, and then takes the obtained coordinate group to be the coordinate group expressing the positions and postures of the characters in the virtual space;
   an emphasis identifier that identifies, from among the plurality of characters one of the plurality of characters as an emphasized character;
   a generating/displaying unit that uses the calculated coordinate group expressing the respective positions and postures of the plurality of characters to generate an image wherein the characters are arranged in the virtual space, and then displays the generated image; and
   an arrangement exchanger, configured such that the arrangement information of one of the characters is selected as a main character, the reference position and reference orientation of the emphasized character is exchanged with the reference position and reference orientation of the main character, the generating/displaying unit being further configured to generate a second image wherein the characters are arranged in the virtual space using the exchanged reference position and reference orientation.

* * * * *